US012289374B2

(12) United States Patent
Liu

(10) Patent No.: US 12,289,374 B2
(45) Date of Patent: Apr. 29, 2025

(54) METHOD AND APPARATUS FOR CHANGING DATA TRANSMISSION SCHEME, DEVICE, AND STORAGE MEDIUM

(71) Applicant: GUANGDONG OPPO MOBILE TELECOMMUNICATIONS CORP., LTD., Dongguan (CN)

(72) Inventor: Jianhua Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/565,343

(22) Filed: Dec. 29, 2021

(65) Prior Publication Data

US 2022/0124158 A1 Apr. 21, 2022

Related U.S. Application Data

(63) Continuation of application No. PCT/CN2020/085982, filed on Apr. 21, 2020.

(30) Foreign Application Priority Data

Feb. 17, 2020 (WO) ................ PCT/CN2020/075586

(51) Int. Cl.
*H04L 67/14* (2022.01)
*H04W 28/18* (2009.01)
(Continued)

(52) U.S. Cl.
CPC ............ *H04L 67/14* (2013.01); *H04W 28/18* (2013.01); *H04W 36/12* (2013.01); *H04W 76/20* (2018.02);
(Continued)

(58) Field of Classification Search
CPC ...... H04L 67/14; H04W 48/18; H04W 76/34; H04W 36/12; H04W 28/18; H04W 76/20; H04W 88/18; H04W 80/00
See application file for complete search history.

(56) References Cited

U.S. PATENT DOCUMENTS

2019/0037516 A1* 1/2019 Kim .................... H04W 60/005
2019/0116518 A1 4/2019 Stojanovski et al.
(Continued)

FOREIGN PATENT DOCUMENTS

CN 108370600 A 8/2018
CN 108738082 A 11/2018
(Continued)

OTHER PUBLICATIONS

International Search Report and Written Opinion dated Nov. 20, 2020 in International Application No. PCT/CN2020/085982. English translation is attached.
(Continued)

*Primary Examiner* — Nicholas R Taylor
*Assistant Examiner* — Angela Widhalm De Rodriguez
(74) *Attorney, Agent, or Firm* — Sheppard, Mullin, Richter & Hampton LLP

(57) ABSTRACT

The present disclosure relates to communication technology, and discloses a method and an apparatus for changing data transmission scheme, a device, and a storage medium. The method includes: the first core network device determining to change a data transmission scheme of a first Protocol Data Unit (PDU) session when the first PDU session meets a first condition; the first core network device transmitting first indication information to a second core network device in response to determining to change the data transmission scheme of the first PDU session; the second core network device initiating a session modification process correspond-
(Continued)

ing to the first PDU session in accordance with the first indication information or initiating a session release process corresponding to the first PDU session in accordance with the first indication information.

9 Claims, 10 Drawing Sheets

(51) Int. Cl.
*H04W 36/12* (2009.01)
*H04W 48/18* (2009.01)
*H04W 76/20* (2018.01)
*H04W 76/34* (2018.01)
*H04W 80/00* (2009.01)
*H04W 88/18* (2009.01)

(52) U.S. Cl.
CPC ........... *H04W 76/34* (2018.02); *H04W 88/18* (2013.01); *H04W 48/18* (2013.01); *H04W 80/00* (2013.01)

(56) References Cited

U.S. PATENT DOCUMENTS

| | | | | |
|---|---|---|---|---|
| 2019/0174466 A1* | 6/2019 | Zhang | ................... | H04L 5/0057 |
| 2020/0029252 A1* | 1/2020 | Marquezan | ....... | H04W 36/0027 |
| 2020/0260525 A1* | 8/2020 | Gan | ...................... | H04W 76/11 |
| 2020/0396000 A1* | 12/2020 | Ryu | ...................... | H04W 48/00 |
| 2020/0413310 A1* | 12/2020 | Han | ................ | H04W 36/00837 |
| 2021/0014893 A1* | 1/2021 | Park | ...................... | H04W 80/08 |
| 2021/0176018 A1* | 6/2021 | Bai | ................... | H04W 72/0446 |

FOREIGN PATENT DOCUMENTS

| | | | | |
|---|---|---|---|---|
| CN | 109923879 A | | 6/2019 | |
| CN | 110167190 A | | 8/2019 | |
| CN | 110366213 A | | 10/2019 | |
| CN | 110366215 A | * | 10/2019 | ........ H04W 36/0022 |
| CN | 110366219 A | | 10/2019 | |
| CN | 110636553 A | | 12/2019 | |
| EP | 3886471 A1 | | 9/2021 | |
| JP | 2019062443 A | | 4/2019 | |
| WO | 2019033369 A1 | | 2/2019 | |
| WO | 2019101074 A1 | | 5/2019 | |
| WO | 2019198721 A1 | | 10/2019 | |
| WO | WO-2019213928 A1 | * | 11/2019 | |

OTHER PUBLICATIONS

International Search Report and Written Opinion dated Oct. 23, 2020 in International Application No. PCT/CN2020/075586. English translation is attached.
Extended European Search Report dated Aug. 10, 2022 received in European Patent Application No. EP 20920318.1.
Communication pursuant to Article 94(3) EPC for European Application 20920318.1 mailed Feb. 24, 2023.
First Office Action from corresponding Chinese Application No. 202111301716.1, dated Apr. 6, 2023 . English translation attached.
The Second Office Action from corresponding Chinese Application No. 202111301716.1, dated Jun. 13, 2023. English translation attached.
Communication under Rule 71(3) EPC—Grant Notice for European Application No. 20920318.1 mailed Jun. 22, 2023.

* cited by examiner

METHOD AND APPARATUS FOR CHANGING DATA TRANSMISSION SCHEME, DEVICE, AND STORAGE MEDIUM

The present application is a continuation of International Application No. PCT/CN2020/085982, filed on Apr. 21, 2020, which claims priority to Patent Application No. PCT/CN2020/075586, titled "METHOD AND APPARATUS FOR CHANGING DATA TRANSMISSION SCHEME, DEVICE, AND STORAGE MEDIUM", filed on Feb. 17, 2020, the contents of which are incorporated herein by reference in their entireties.

TECHNICAL FIELD

The embodiments of the present disclosure relates to communication technology, and more particularly, to a method and an apparatus for changing data transmission scheme, a device, and a storage medium.

BACKGROUND

Cellular Internet of Things (CIoT) is an Internet of Things using Narrowband Internet of Things (NB-IoT) access technology or enhanced Machine Type Communication (eMTC) access technology to allow CIoT terminals to access mobile communication networks.

A typical CIoT system is Evolved Packet System (EPS). In order to meet the requirements of higher-speed services, the $3^{rd}$ Generation Partnership Project (3GPP) defines the $5^{th}$ Generation System (5GS, or the $5^{th}$ Generation mobile communication system). The 5GS supports Protocol Data Unit (PDU) connection services, which allow exchanging PDU data packets between User Equipments (UEs) and Data Networks (DNs). A PDU connection service can be according to a UE initiating establishment of a PDU session. After the PDU session is established, a data transmission channel between the UE and the DN can be established.

Since there are multiple types of data transmission schemes between the UE and the DN, the setting of the data transmission type supported by the PDU session needs to be further discussed.

SUMMARY

The embodiments of the present disclosure provide a method and an apparatus for changing data transmission scheme, a device, and a storage medium. The technical solutions are described as follows.

In an aspect, a method for changing data transmission scheme is provided according to an embodiment of the present disclosure. The method is applied in a first core network device, and includes: transmitting, in response to determining to change a data transmission scheme of a first PDU session, first indication information to a second core network device and/or a terminal device. The first indication information indicates to change the data transmission scheme of the first PDU session, and the first PDU session refers to a PDU session established between a DN and the terminal device.

In another aspect, a method for changing data transmission scheme is provided according to an embodiment of the present disclosure. The method is applied in a terminal device, and includes: transmitting, in response to determining to change a data transmission scheme of a first PDU session, second indication information to a first core network device and/or a second core network device. The second indication information indicates to change the data transmission scheme of the first PDU session, and the first PDU session refers to a PDU session that has been established between a DN and the terminal device.

In another aspect, a method for changing data transmission scheme is provided according to an embodiment of the present disclosure. The method is applied in a second core network device, and includes: receiving first indication information transmitted by a first core network device or second indication information transmitted by a terminal device. The first indication information is transmitted when the first core network device determines to change a data transmission scheme of a first PDU session, and the second indication information is transmitted when the terminal device determines to change the data transmission scheme of the first PDU session. The first indication information and the second indication information each indicate to change the data transmission scheme of the first PDU session, and the first PDU session refers to a PDU session that has been established between a DN and the terminal device.

In another aspect, an apparatus for changing data transmission scheme is provided according to an embodiment of the present disclosure. The apparatus is applied in a first core network device, and includes: a first information transmitting module configured to transmit, in response to determining to change a data transmission scheme of a first PDU session, first indication information to a second core network device and/or a terminal device. The first indication information indicates to change the data transmission scheme of the first PDU session, and the first PDU session refers to a PDU session that has been established between a DN and the terminal device.

In another aspect, an apparatus for changing data transmission scheme is provided according to an embodiment of the present disclosure. The apparatus is applied in a terminal device, and includes: a second information transmitting module configured to transmit, in response to determining to change a data transmission scheme of a first PDU session, second indication information to a first core network device and/or a second core network device. The second indication information indicates to change the data transmission scheme of the first PDU session, and the first PDU session refers to a PDU session that has been established between a DN and the terminal device.

In another aspect, an apparatus for changing data transmission scheme is provided according to an embodiment of the present disclosure. The apparatus is applied in a second core network device, and includes: an information receiving module configured to receive first indication information transmitted by a first core network device or second indication information transmitted by a terminal device. The first indication information is transmitted when the first core network device determines to change a data transmission scheme of a first PDU session, and the second indication information is transmitted when the terminal device determines to change the data transmission scheme of the first PDU session. The first indication information and the second indication information each indicate to change the data transmission scheme of the first PDU session, and the first PDU session refers to a PDU session that has been established between a DN and the terminal device.

In another aspect, a core network device is provided according to an embodiment of the present disclosure. The core network device includes a processor and a transceiver connected to the processor. The transceiver is configured to transmit, in response to determining to change a data transmission scheme of a first PDU session, first indication information to a second core network device and/or a terminal device. The first indication information indicates to change the data transmission scheme of the first PDU session, and the first PDU session refers to a PDU session that has been established between a DN and the terminal device.

In another aspect, a terminal device is provided according to an embodiment of the present disclosure. The terminal device includes a processor and a transceiver connected to the processor. The transceiver is configured to transmit, in response to determining to change a data transmission scheme of a first PDU session, second indication information to a first core network device and/or a second core network device. The second indication information indicates to change the data transmission scheme of the first PDU session, and the first PDU session refers to a PDU session that has been established between a DN and the terminal device.

In another aspect, a core network device is provided according to an embodiment of the present disclosure. The core network device includes a processor and a transceiver connected to the processor. The transceiver is configured to receive first indication information transmitted by a first core network device or second indication information transmitted by a terminal device. The first indication information is transmitted when the first core network device determines to change a data transmission scheme of a first PDU session, and the second indication information is transmitted when the terminal device determines to change the data transmission scheme of the first PDU session. The first indication information and the second indication information each indicate to change the data transmission scheme of the first PDU session, and the first PDU session refers to a PDU session that has been established between a DN and the terminal device.

In another aspect, a computer-readable storage medium is provided according to an embodiment of the present disclosure. The computer-readable storage medium has a computer program stored therein. The computer program, when executed by a processor of a first core network device, implements the above method for changing data transmission scheme applied in the first core network device.

In another aspect, a computer-readable storage medium is provided according to an embodiment of the present disclosure. The computer-readable storage medium has a computer program stored therein. The computer program, when executed by a processor of a terminal device, implements the above method for changing data transmission scheme applied in the terminal device.

In another aspect, a computer-readable storage medium is provided according to an embodiment of the present disclosure. The computer-readable storage medium has a computer program stored therein. The computer program, when executed by a processor of a second core network device, implements the above method for changing data transmission scheme applied in the second core network device.

In another aspect, a chip is provided according to an embodiment of the present disclosure. The chip includes a programmable logic circuit and/or program instructions. The chip is configured to, when running on a first core network device, implement the above method for changing data transmission scheme applied in the first core network device.

In another aspect, a chip is provided according to an embodiment of the present disclosure. The chip includes a programmable logic circuit and/or program instructions. The chip is configured to, when running on a terminal device, implement the above method for changing data transmission scheme applied in the terminal device.

In another aspect, a chip is provided according to an embodiment of the present disclosure. The chip includes a programmable logic circuit and/or program instructions. The chip is configured to, when running on a second core network device, implement the above method for changing data transmission scheme applied in the second core network device.

The technical solutions according to the embodiments of the present disclosure may include the following advantageous effects.

When it is determined to be change a data transmission scheme of a PDU session, the data transmission scheme of the PDU session is changed, thereby avoiding the problem that the PDU session can only use a fixed data transmission scheme, and improving the flexibility of the data transmission scheme of the PDU session and thus the capability of the PDU session to adapt to different service scenarios. In addition, the technical solutions according to the embodiments of the present disclosure can avoid the problem that when a data transmission scheme of a certain PDU session is not suitable for a current service scenario, a PDU session having a data transmission scheme suitable for the current service scenario has to be re-established, and avoid unnecessary PDU sessions established between the terminal device and the DN, which would otherwise cause a waste of resources, thereby reducing the processing overhead of the terminal device, and also improving the repetitive utilization of the PDU session. In addition, in the embodiments of the present disclosure, the core network device may determine to change the data transmission scheme of the PDU session, or the terminal device may determine to change the data transmission scheme of the PDU session, such that different entities can determine to change the data transmission scheme of the PDU session, thereby improving the flexibility in changing the data transmission scheme of the PDU session.

DESCRIPTION OF EMBODIMENTS

In order to make the objects, technical solutions, and advantages of the present disclosure more apparent, the embodiments of the present disclosure will be described in further detail below in conjunction with the accompanying drawings.

The network architectures and service scenarios described in the embodiments of the present disclosure are provided to illustrate the technical solutions of the embodiments of the present disclosure more clearly, and do not constitute any limitation on the technical solutions according to the embodiments of the present disclosure. It can be appreciated by those of ordinary skill in the art that with the evolution of the network architecture and the emergence of new service scenarios, the technical solutions according to the embodiments of the present disclosure are equally applicable to similar technical problems.

The technical solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Universal Mobile Telecommunication System (UMTS), Worldwide Interoperability for Microwave Access (WiMAX) communication system, the $5^{th}$ Generation (5G) or New Radio (NR) system, or any other evolved system in the future.

Figure 1:
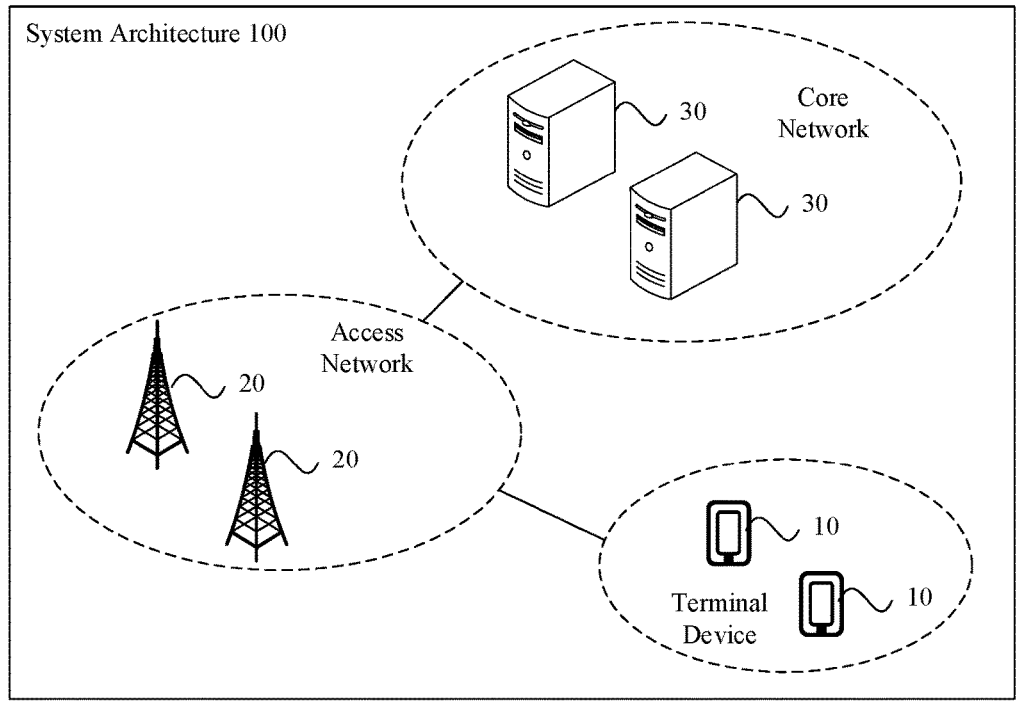
FIG. 1 is a schematic diagram showing a system architecture according to an embodiment of the present disclosure.

FIG. 1 is a schematic diagram showing a system architecture of a communication system according to an embodiment of the present disclosure. As illustrated in FIG. 1, the system architecture 100 may include: a terminal device 10, an access network device 20, and a core network device 30.

The terminal device 10 may refer to a User Equipment (UE), an access terminal, a user unit, a user station, a mobile station, a mobile console, a remote station, a remote terminal, a mobile device, a wireless communication device, a user agent, or a user device. Alternatively, the terminal device can be a cellular phone, a cordless phone, a Session Initiation Protocol (SIP) phone, a Wireless Local Loop (WLL) station, a Personal Digital Assistant (PDA), a handheld device or a computing device having a wireless communication function, another processing device connected to a wireless modem, a vehicle-mounted device, a wearable device, a terminal device in a 5G System (5GS), or a terminal device in a future evolved Public Land Mobile Network (PLMN), etc. The embodiment of the present disclosure is not limited to any of these examples. Optionally, the terminal device in the embodiment of the present disclosure may be a CIoT terminal, which has application characteristics of low cost, simple functions, low power consumption, and infrequent user data transmission.

The access network device 20 is a device deployed in an access network for providing the terminal device 10 with a wireless communication function. The access network device 20 may include various forms of macro base stations, micro base stations, relay stations, access points, and so on. In systems using different radio access technologies, the names of devices with access network device functions may be different. For example, in a 5G NR system, they are called gNodeBs or gNBs. With the evolution of communication technology, the name "access network device" may change. For the purpose of description, in the embodiments of the present disclosure, the above devices that provide wireless communication functions for the terminal device 10 are collectively referred to as access network devices.

The core network device 30 refers to a device that can provide the terminal device 10 with functions such as session management, mobility management, policy management, and security authentication. In an embodiment of the present disclosure, the core network device 30 may include a first core network device and a second core network device. The first core network device is responsible for the access management and mobility management of the terminal device 10, and the second core network device is responsible for the session management of the terminal device 10. Optionally, in the 5GS system, the first core network can be implemented as a Core Access and Mobility Management Function (AMF), and the second core network device can be implemented as a Session Management Function (SMF).

Figure 2:
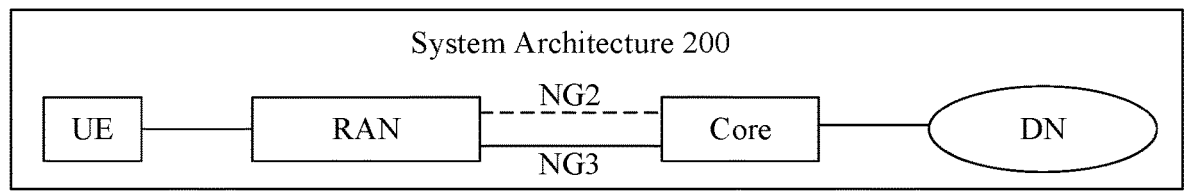
FIG. 2 is a schematic diagram showing a 5GS system architecture according to an embodiment of the present disclosure.

FIG. 2 is a schematic diagram showing a system architecture of a 5GS system according to an embodiment of the present disclosure. As illustrated in FIG. 2, the system architecture 200 may include: a UE, a Radio Access Network (RAN), a core network (Core), and a DN. Here, the UE, RAN, and Core are main components of the architecture. Logically, they can be divided into two parts: a user plane and a control plane. The control plane is responsible for management of the mobile network, and the user plane is responsible for transmission of service data. In FIG. 2, the NG2 reference point is between the RAN control plane and the Core control plane, the NG3 reference point is between the RAN user plane and the Core user plane, and the NG6 reference point is between the Core user plane and a data network.

UE: It is a portal for mobile users to interact with the network. It can provide basic computing and storage capabilities, display service windows to users, and accept users' operations and inputs. The UE may use the next-generation air interface technology to establish a signal connection and a data connection with the RAN to transmit control signals and service data to the mobile network.

RAN: Similarly to a base station in a traditional network, it is deployed close to the UE to provide network access for authorized users in a specific area. It can use transmission tunnels of different quality to transmit user data according to user's level and service requirements. The RAN can manage its own resources, use them properly, provide access services for UEs on demand, and forward control signals and user data between the UEs and the core network.

Core: It is responsible for maintaining subscription data of the mobile network, managing network elements of the mobile network, and providing UEs with functions such as session management, mobility management, policy management, and security authentication. When a UE is attached, it provides network access authentication for the UE. When a UE has a service request, it allocates network resources for the UE. When a UE is moving, it updates network resources for the UE. When a UE is idle, it provides a fast recovery mechanism for the UE. When the UE is detached, it releases network resources for the UE. When the UE has service data, it provides data routing functions for the UE, such as forwarding uplink data to a DN, or receiving downlink data for the UE from the DN and forwarding it to the RAN for transmitting it to the UE.

DN: It is a data network that provides business services to users. Generally, a client is provided at a UE and a server is provided in the data network. The data network can be a private network, such as a local area network, or an external network that is not under control of any operator, such as the Internet, or a proprietary network jointly deployed by operators, e.g., for configuring IP Multimedia Core Network Subsystem (IMS) services.

Figure 3:
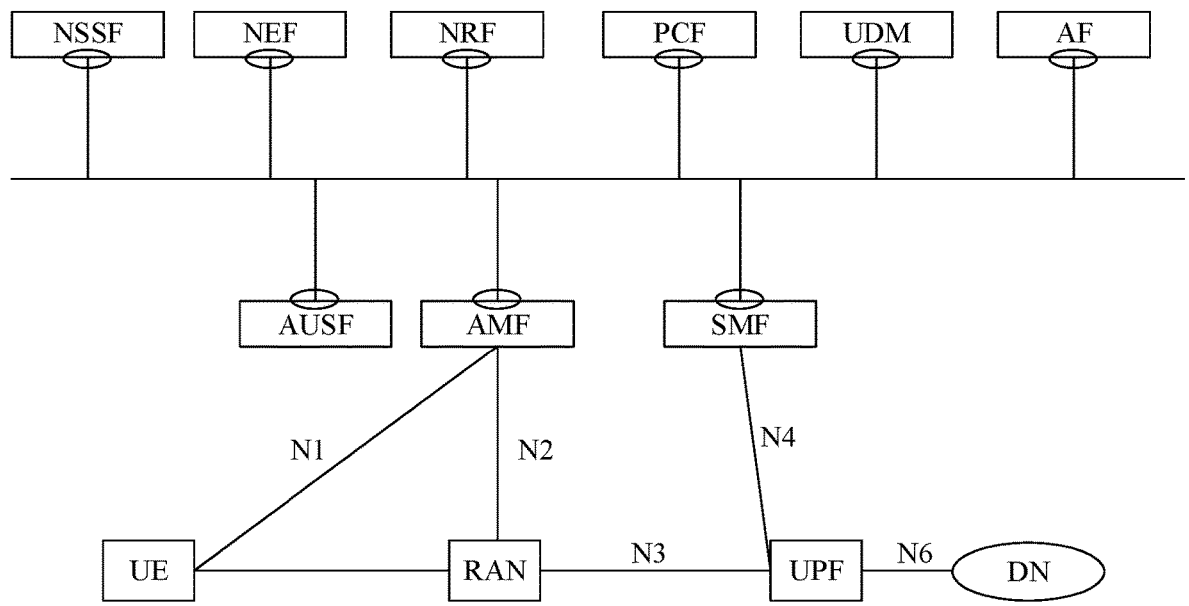
FIG. 3 is a schematic diagram showing a 5GS system architecture according to another embodiment of the present disclosure.

FIG. 3 shows a detailed architecture determined on the basis of FIG. 2. The core network user plane includes a User Plane Function (UPF), and the core network control plane includes an Authentication Server Function (AUSF), an AMF, an SMF, a Network Slice Selection Function (NSSF), a Network Exposure Function (NEF), an NF Repository Function (NRF), a Unified Data Management (UDM), a Policy Control Function (PCF), an Application Function (AF). The functions of these functional entities are described as follows:

UPF: for user data packet forwarding according to SMF routing rules;
AUSF: for UE security authentication;
AMF: for UE access management and mobility management;
SMF: for UE session management;
NSSF: for selection of a network slice for UE;
NEF: for exposure of network functions to third parties through northbound API interfaces;
NRF: for providing storage function and selection function of network function entity information for other network elements;
UDM: for user subscription context management;
PCF: for user policy management;
AF: for user application management.

In the architecture shown in FIG. 3, the N1 interface is the reference point between the UE and the AMF; the N2 interface is the reference point between the RAN and the AMF, for transmitting NAS messages, etc.; the N3 interface is the reference point between the RAN and the UPF, for transmitting user plane data, etc.; the N4 interface is the reference point between the SMF and the UPF, for transmitting information such as tunnel identification information for an N3 connection, data buffer indication information, and downlink data notification message; and the N6 interface is the reference point between the UPF and the DN, for transmitting user plane data.

It is to be noted that the names of the interfaces between the respective network elements in FIG. 2 and FIG. 3 are exemplary only, and different names of interfaces may be used in a specific implementation, and the embodiment of the present disclosure is not limited to any of these examples. The names of the respective network elements (such as SMF, AF, UPF, etc.) included in FIG. 2 and FIG. 3 are exemplary only, and do not limit the functions of the network elements themselves. In the 5GS and other networks in the future, the above network elements may also have other names, and the embodiment of the present disclosure is not limited to any of these examples. For example, in a 6G network, some or all of the above network elements may reuse the terminology in the 5G, or may use other names, etc. This is explained here and will not be repeated in the following. In addition, it can be appreciated that the names of the messages (or signaling) transmitted between the respective network elements as described above are exemplary only, and do not constitute any limitation on the functions of the messages themselves.

In an example, the system shown in FIG. 1 above can support a PDU connection service, which is a service for exchanging PDU data packets between a UE and a DN. The PDU connection service can be implemented by the UE initiating establishment of a PDU session. After the establishment of the PDU session, a data transmission channel between the UE and the DN is established. There are many types of data transmission schemes between the UE and the DN. In the 5GS system, the data transmission scheme of the PDU session between the UE and the DN is typically negotiated and determined by the UE and AMF. When the data transmission scheme negotiated between the UE and AMF changes, the data transmission scheme of the PDU session should be changed accordingly. However, the AMF in the related art can only determine a data transmission scheme of a certain PDU session between the UE and the DN, but cannot change the data transmission scheme of the PDU session.

In view of this, an embodiment of the present disclosure provides a method for changing data transmission scheme, capable of solving the above problem and providing a specific method for changing a data transmission scheme of a PDU session.

In the following, the technical solutions of the present disclosure will be introduced and explained with reference to a number of exemplary embodiments.

In an embodiment of the present disclosure, a first core network device may determine whether a data transmission scheme of a PDU session needs to be changed, or a terminal device may determine whether the data transmission scheme of the PDU session needs to be changed. When the first core network device determines to change the data transmission scheme of the PDU session, a second core network device can perform a modification process for the PDU session, or the terminal device can perform a modification process for the PDU session. When the terminal device determines to change the data transmission scheme of the PDU session, an SMF can perform a modification process for the PDU session. The following embodiment of FIG. 4 and the embodiment of FIG. 5 correspond to the specific methods for changing data transmission scheme when the first core network device determines to change the data transmission scheme of the PDU session, and the following embodiment of FIG. 6 and embodiment of FIG. 7 correspond to the specific methods for changing data transmission scheme when the terminal device determines to change the data transmission scheme of the PDU session.

Figure 4:
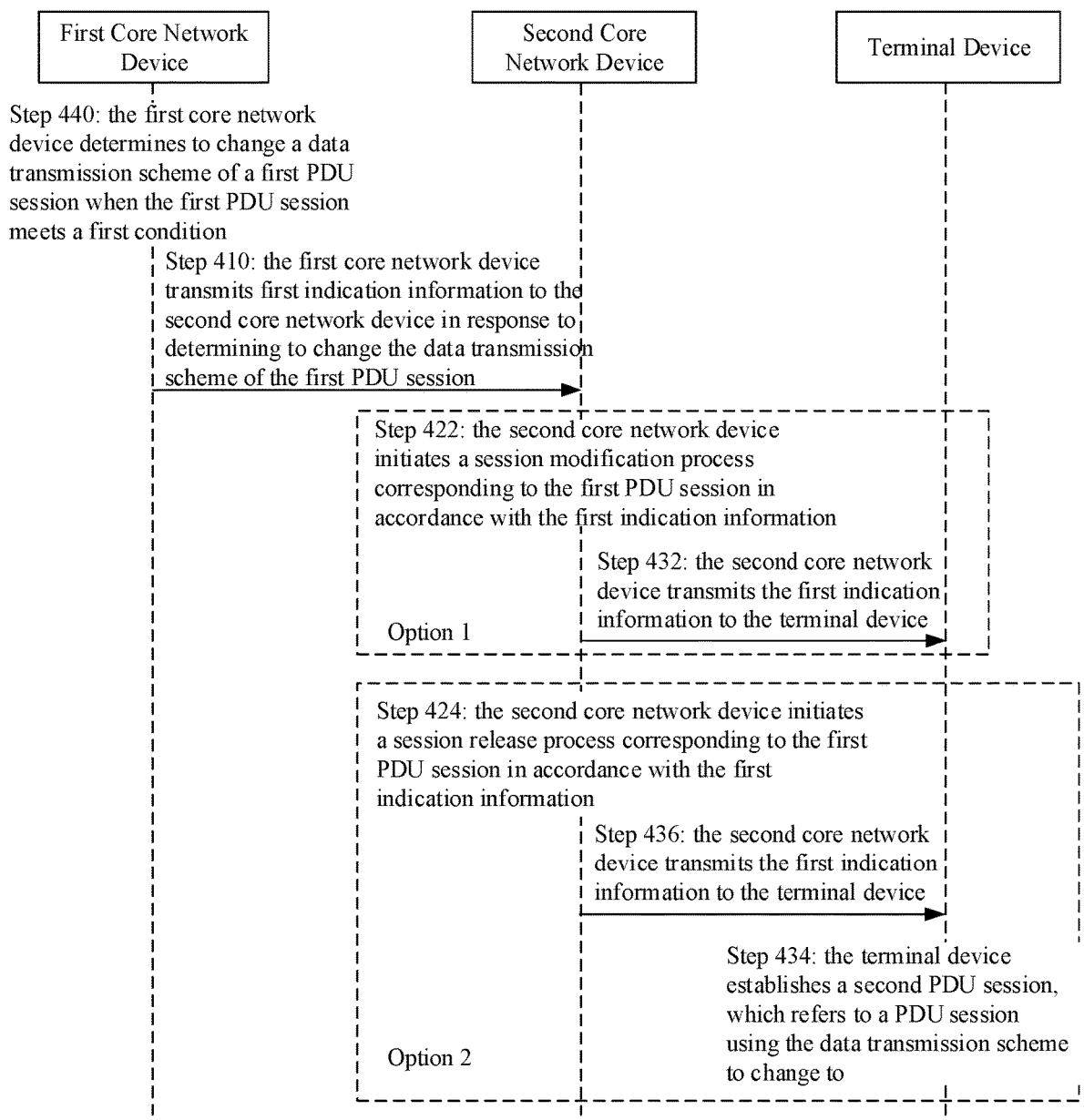
FIG. 4 is a flowchart illustrating a method for changing data transmission scheme according to an embodiment of the present disclosure.

FIG. 4 is a flowchart illustrating a method for changing data transmission scheme according to an embodiment of the present disclosure. The method can be applied in the system architecture shown in FIGS. 1 to 3, and the method may include the following step.

At step 410, a first core network device transmits first indication information to a second core network device in response to determining to change a data transmission scheme of a first PDU session.

Since the communication system according to the embodiment of the present disclosure supports the PDU connection service, i.e., the service of PDU exchange is provided between a terminal device and a DN identified by a Data Network Name (DNN), by establishing a PDU session between the terminal device and the DN to support the PDU connection service. Since terminal devices or DNs may use different types of data transmission protocols in actual applications, or may support different types of service scenarios, which may change in the applications, PDU sessions established between different terminal devices and DNs, or a PDU session established between a terminal device and a DN at different time periods, may use different data transmission schemes.

Optionally, the data transmission scheme of the PDU session may include at least one of: a control plane data transmission scheme only; a user plane data transmission scheme only; or both the control plane data transmission scheme and the user plane data transmission scheme. Different data transmission schemes use different transmission protocols. The control plane data transmission scheme uses a control plane protocol stack, and the user plane data transmission scheme uses a user plane protocol stack. In the 5GS system, the control plane protocol stack includes a Non-Access Stratum (NAS) layer, a Radio Resource Control (RRC) layer, a Packet Data Convergence Protocol (PDCP) layer, a Radio Link Control (RLC) layer, a Medium Access Control (MAC) layer, and a Physical (PHY) layer. The user plane protocol stack includes a Service Data Adaptation Protocol (SDAP) layer, a PDCP layer, an RLC layer, a MAC layer, and a PHY layer.

In an embodiment of the present disclosure, the first PDU session refers to a PDU session that has been established between the terminal device and the DN, and the first PDU session may support any of the above data transmission schemes. In response to determining to change the data transmission scheme of the first PDU session, the first core network device may transmit first indication information to the second core network device, and the first indication information indicates to change the data transmission scheme of the first PDU session. For details of the first core network device and the second core network device, reference can be made to the above embodiment, and description thereof will be omitted.

Optionally, the data transmission scheme to change to may be notified in the first indication information, or the data transmission scheme to change to may be predefined in a protocol. That is, the data transmission scheme to change to may be determined by the first core network device. For example, the first core network device may determine the data transmission scheme to change to based on a currently supported service scenario, an access parameter of the terminal device, etc. Alternatively, the data transmission scheme to change to can be predefined in the protocol. For example, a default data transmission scheme can be predefined in the protocol. When a data transmission scheme of a certain PDU session needs to be changed, the data transmission scheme to change to can be determined as the default data transmission scheme. In an example, when the data transmission scheme to change to is notified in the first indication information, the second core network device can parse the first indication information to determine the data transmission scheme to change to. In another example, when the data transmission scheme to change to is predefined in the protocol, after the second core network device parses the first indication information, it needs to further determine the data transmission scheme to change to according to the protocol. It is to be noted that when the data transmission scheme to change to is predefined in the protocol, the data transmission scheme to change to can also be carried in the first indication information, such that the second core network device can quickly determine the data transmission scheme to change to.

In a possible implementation, after the second core network device receives the first indication information, there may be two options to change the data transmission scheme of the first PDU session. Which of the two options is to be used may depend on a local implementation of the second core network device. These two options will be described below.

Option 1: The second core network device initiates a PDU session modification process.

In an example, as illustrated in FIG. 4, the above method may further include: step 422 in which the second core network device initiates a session modification process corresponding to the first PDU session in accordance with the first indication information. The modification process of the first PDU session is used to change the data transmission scheme of the first PDU session to the data transmission scheme to change to as determined based on the first indication information. In an embodiment of the present disclosure, the second core network device can initiate the session modification process corresponding to the first PDU session, and can perform the session modification process by modifying a Quality of Service (QoS) flow exchanged between the terminal device and a network device (the network device includes the first core network device and the second core network device). Since the QoS flow is the finest QoS differentiation granularity in the PDU session, the difference between two PDU sessions is that their QoS flows are different. Generally, different QoS flows mean that configuration parameters of the QoS flows are different. Optionally, the configuration parameters of a QoS flow may include: 5QI, Allocation and Retention Priority (ARP), Reflective QoS Attribute (RQA), Flow Bit Rate (FBR), Aggregate Maximum Bit Rate (AMBR), etc.

Optionally, in order to allow the terminal device to update the data transmission scheme of the first PDU session to the data transmission scheme to change to, as illustrated in FIG. 4, the above method may further include: step 432 in which the second core network device transmits the first indication information to the terminal device. While initiating the session modification process, or after completing the PDU session modification process, the second core network device may further transmit the first indication information to the terminal device, such that the terminal device can know that the data transmission scheme of the first PDU session has been changed. The embodiment of the present disclosure is not limited to any specific timing when the second core network device transmits the first indication information to the terminal device, i.e., not limited to any specific order in which the step 422 and the step 432 are performed. Optionally, the second core network device may also transmit modification information related to the session modification process corresponding to the first PDU session, e.g., configuration parameters of the modified QoS flow, to the terminal device (the embodiment of the present disclosure is not limited to any specific modification information). It is to be noted that, in an embodiment of the present disclosure, the first indication information transmitted by the first core network device to the second core network device and the first indication information transmitted by the second core network device to the terminal device may have different forms, but they are both used to indicate to change the data transmission scheme of the first PDU session.

Option 2: The second core network device initiates a PDU session release process.

In an example, as illustrated in FIG. 4, the above method may further include: step 424 in which the second core network device initiates a session release process corresponding to the first PDU session in accordance with the first indication information. The session release process corresponding to the first PDU session is used to release a resource associated with the first PDU session. In an embodiment of the present disclosure, the second core network device may initiate the session release process corresponding to the first PDU session, and may withdraw the use of the first PDU session by releasing the resources associated with the first PDU session. Optionally, in an embodiment of the present disclosure, the resource associated with the first PDU session may include: an IP address/prefix allocated for the IP-based first PDU session (which may include releasing a plurality of prefixes in case of multiple donors), a UPF resource used by the first PDU session (which may include N3/N9 termination), etc.

Optionally, in order to perform the PDU connection service using the data transmission scheme to change to, as illustrated in FIG. 4, the above method may further include: step 434 in which the terminal device establishes a second PDU session, which refers to a PDU session using the data transmission scheme to change to. Since the terminal device's own capabilities may only support the data transmission scheme in the first PDU session, or the terminal device may only prefer to use the data transmission scheme in the first PDU session, the terminal device may establish the second PDU session when it supports and/or prefers to use the data transmission scheme to change to, so as to perform the PDU connection service using the data transmission scheme to change to. This can ensure that the data transmission scheme matches the capabilities and/or preferences of the terminal device, and avoid the problem that the terminal device cannot perform the PDU connection service using the data transmission scheme to change to due to mismatching, and also avoid establishing the second PDU session in case of mismatching, thereby saving the processing overhead of the terminal device. In addition, when the terminal device does not support or does not prefer to use the data transmission scheme to change to, the terminal device may not establish the second PDU session, or the terminal device may not establish the second PDU session temporarily, and will establish the second PDU session when it supports and/or prefer to use the data transmission scheme to change to subsequently. On one hand, this will ensure that the data transmission scheme matches the capabilities and/or preferences of the terminal device, and on the other hand, the terminal device can perform the PDU connection service using the data transmission scheme to change to timely.

Optionally, the above method may further include: step 436 in which the second core network device transmits the first indication information to the terminal device. The second core network device may further transmit the first indication information to the terminal device while initiating the PDU session release process or after completing the PDU session release process, such that the terminal device can know that the data transmission scheme of the first PDU session has been changed. The embodiment of the present disclosure is not limited to any specific timing when the second core network device transmits the first indication information to the terminal device, i.e., not limited to any specific order in which the above step 424 and step 434 are performed. Optionally, in order for the terminal device to know that the second core network device is performing the session release process corresponding to the first PDU session and to establish a second PDU session using the data transmission scheme in a timely manner, the second core network device can transmit indication information to the terminal device, indicating to release the first PDU session or to establish the second PDU session. After receiving the indication information, the terminal device can establish the second PDU session to complete the process of changing the data transmission scheme of the first PDU session.

It is to be noted that, in an embodiment of the present disclosure, the first indication information transmitted by the first core network device to the second core network device and the first indication information transmitted by the second core network device to the terminal device may have different forms, but they are both used to indicate to change the data transmission scheme of the first PDU session.

In another possible implementation, an embodiment of the present disclosure also provides a specific method for determining to change a data transmission scheme of a first PDU session. As illustrated in FIG. 4, the above method may further include: step 440 in which the first core network device determines to change the data transmission scheme of the first PDU session when the first PDU session meets a first condition. In an embodiment of the present disclosure, the first core network device may detect information related to the data transmission scheme of the first PDU session, e.g., capability information of the terminal device and/or the network device, a local policy of the first core network device, a data transmission scheme negotiated between the terminal device and the first core network device, or the like. Upon detecting that the information meets the first condition, it can determine to change the data transmission scheme of the first PDU session. Optionally, the first condition may include at least one of: the data transmission scheme negotiated between the terminal device and the first core network device changes; the local policy of the first core network device changes; subscription information of the terminal device changes; the capability information of the terminal device changes; or the capability information of the network device changes (the network device includes the first core network device and/or the second core network device). Optionally, the first condition may be determined by the first core network device, or may be predefined in a protocol. The embodiment of the present disclosure is not limited to any specific method for determining the first condition.

In summary, in the technical solutions according to the embodiments of the present disclosure, when it is determined to be change a data transmission scheme of a PDU session, the data transmission scheme of the PDU session is changed, thereby avoiding the problem that the PDU session can only use a fixed data transmission scheme, and improving the flexibility of the data transmission scheme of the PDU session and thus the capability of the PDU session to adapt to different service scenarios. In addition, the technical solutions according to the embodiments of the present disclosure can avoid the problem that when a data transmission scheme of a certain PDU session is not suitable for a current service scenario, a PDU session having a data transmission scheme suitable for the current service scenario has to be re-established, and avoid unnecessary PDU sessions established between the terminal device and the DN, which would otherwise cause a waste of resources, thereby reducing the processing overhead of the terminal device, and also improving the repetitive utilization of the PDU session.

In addition, in the embodiment of the present disclosure, the core network device can change the data transmission scheme of the PDU session in two options, one is to initiate the session modification process corresponding to the PDU session, and the other is to initiate the session release process corresponding to the PDU session. Then, the terminal device can re-establish the PDU session. Which of the two options is to be used may depend on the local implementation of the core network device. Therefore, the technical solution according to the embodiment of the present disclosure fully considers the different local implementations of the core network devices and the actual applications, thereby providing an improved changing method.

In addition, since the terminal device's own capabilities may only support the data transmission scheme in the released PDU session, or the terminal device may only prefer to use the data transmission scheme in the released PDU session, in the embodiment of the present disclosure, the terminal device can re-establish the PDU session when it supports and/or prefers to use the data transmission scheme to change to, and perform the PDU connection service using the data transmission scheme to change to. This can ensure that the data transmission scheme matches the capabilities and/or preferences of the terminal device, and avoid the problem that the terminal device cannot perform the PDU connection service using the data transmission scheme to change to due to mismatching, and also avoid establishing the second PDU session in case of mismatching, thereby saving the processing overhead of the terminal device.

In addition, the embodiment of the present disclosure provides a method for determining whether to change the data transmission scheme of the PDU session. That is, when the PDU session meets a certain condition, the core network device determines to change the data transmission scheme of the PDU session. The condition includes a number of influencing factors for the data transmission scheme of the PDU session, thereby providing a reference for the core network device to determine whether the data transmission scheme of the PDU session needs to be changed, such that the accuracy of the determination result at the core network device can be improved.

Figure 5:
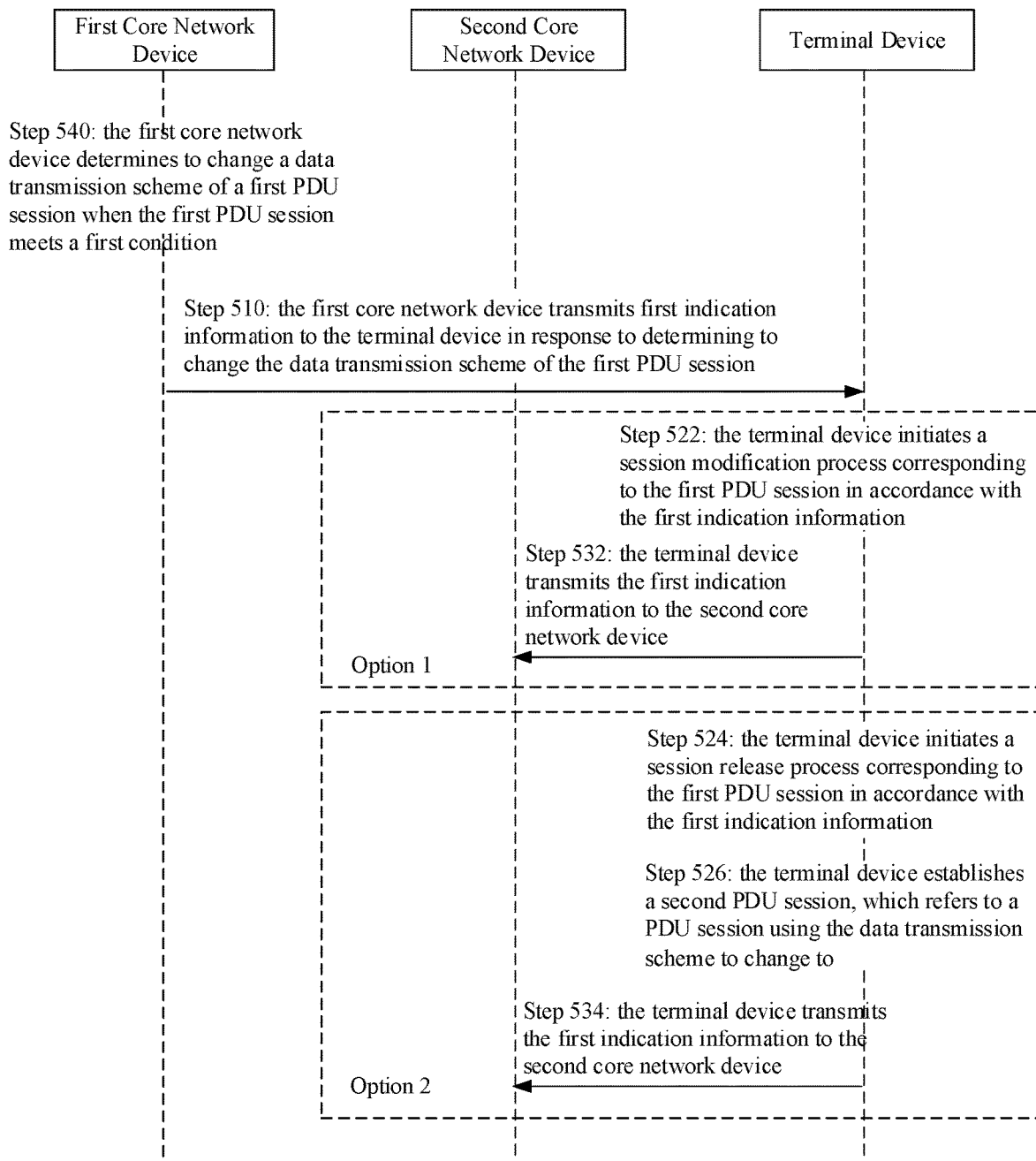
FIG. 5 is a flowchart illustrating a method for changing data transmission scheme according to another embodiment of the present disclosure.

FIG. 5 shows a flowchart of another method for changing data transmission scheme according to an embodiment of the present disclosure. The method can be applied to the system architecture shown in FIGS. 1 to 3. The method may include the following step.

At step 510, a first core network device transmits first indication information to a terminal device in response to determining to change a data transmission scheme of a first PDU session.

Optionally, the data transmission scheme may include at least one of: a control plane data transmission scheme only; a user plane data transmission scheme only; or both the control plane data transmission scheme and the user plane data transmission scheme. In an embodiment of the present disclosure, the first PDU session refers to a PDU session that has been established between a DN and the terminal device, and the first indication information indicates to change the data transmission scheme of the first PDU session. Optionally, the data transmission scheme to change to may be notified in the first indication information; or the data transmission scheme to change to may be predefined in a protocol.

In a possible implementation, after the terminal device receives the first indication information, there can be two options to change the data transmission scheme of the first PDU session. Which of the two options is to be used may depend on a local implementation of the terminal device. These two options will be described below.

Option 1: The terminal device initiates a PDU session modification process.

In an example, as illustrated in FIG. 5, the above method may further include: step 522 in which the terminal device initiates a session modification process corresponding to the first PDU session in accordance with the first indication information.

Optionally, in order to allow the second core network device to update the data transmission scheme of the first PDU session to the data transmission scheme to change to, as illustrated in FIG. 5, the above method may further include: step 532 in which the terminal device transmits the first indication information to the second core network device.

Option 2: The terminal device initiates a PDU session release process.

In an example, as illustrated in FIG. 5, the above method may further include: step 524 in which the terminal device initiates a session release process corresponding to the first PDU session in accordance with the first indication information.

Optionally, in order to perform the PDU connection service using the data transmission scheme to change to, as illustrated in FIG. 5, the above method may further include: step 526 in which the terminal device establishes a second PDU session, which refers to a PDU session using the data transmission scheme to change to. Optionally, the terminal device may establish the second PDU session when it supports and/or prefers to use the data transmission scheme to change to.

Optionally, in order to allow the second core network device to update the data transmission scheme of the first PDU session to the data transmission scheme to change to, as illustrated in FIG. 5, the above method may further include: step 534 in which the terminal device transmits the first indication information to the second core network device.

In another possible implementation, as illustrated in FIG. 5, the above method may further include: step 540 in which the first core network device determines to change the data transmission scheme of the first PDU session when the first PDU session meets a first condition. Optionally, the first condition may include at least one of: a data transmission scheme negotiated between the terminal device and the first core network device changes; a local policy of the first core network device changes; subscription information of the terminal device changes; capability information of the terminal device changes; or capability information of a network device changes (the network device includes the first core network device and/or the second core network device).

The difference between the embodiment of FIG. 4 and the embodiment of FIG. 5 is that entities that change the data transmission scheme of the first PDU session are different. In the embodiment of FIG. 4, the second core network device changes the data transmission scheme of the first PDU session, whereas in the embodiment of FIG. 5, the terminal device changes the data transmission scheme of the first PDU session. In addition, for the details in the embodiment of FIG. 5, such as the PDU session, the data transmission scheme of the PDU session, the first PDU session, the data transmission scheme to change to, the session modification process corresponding to the first PDU session, the session release process corresponding to the first PDU session, the establishment of the second PDU session, the determination to change the data transmission scheme of the first PDU session, the first condition, etc., reference can be made to the description of the corresponding content in the embodiment of FIG. 4. For detailed description, reference can be made to the above embodiment described in connection with FIG. 4, and the description thereof will be omitted here.

In summary, in the technical solution according to the embodiment of the present disclosure, when it is determined to be change a data transmission scheme of a PDU session, the data transmission scheme of the PDU session is changed, thereby avoiding the problem that the PDU session can only use a fixed data transmission scheme, and improving the flexibility of the data transmission scheme of the PDU session and thus the capability of the PDU session to adapt to different service scenarios. In addition, the technical solutions according to the embodiments of the present disclosure can avoid the problem that when a data transmission scheme of a certain PDU session is not suitable for a current service scenario, a PDU session having a data transmission scheme suitable for the current service scenario has to be re-established, and avoid unnecessary PDU sessions established between the terminal device and the DN, which would otherwise cause a waste of resources, thereby reducing the processing overhead of the terminal device, and also improving the repetitive utilization of the PDU session.

In addition, in the embodiment of the present disclosure, the terminal device can change the data transmission scheme of the PDU session in two options, one is to initiate the session modification process corresponding to the PDU session, and the other is to initiate the session release process corresponding to the PDU session. Then, the terminal device can re-establish the PDU session. Which of the two options is to be used may depend on the local implementation of the terminal device. Therefore, the technical solution according to the embodiment of the present disclosure fully considers the different local implementations of the terminal devices and the actual applications, thereby providing an improved changing method.

In addition, since the terminal device's own capabilities may only support the data transmission scheme in the released PDU session, or the terminal device may only prefer to use the data transmission scheme in the released PDU session, in the embodiment of the present disclosure, the terminal device can re-establish the PDU session when it supports and/or prefers to use the data transmission scheme to change to, and perform the PDU connection service using the data transmission scheme to change to. This can ensure that the data transmission scheme matches the capabilities and/or preferences of the terminal device, and avoid the problem that the terminal device cannot perform the PDU connection service using the data transmission scheme to change to due to mismatching, and also avoid establishing the second PDU session in case of mismatching, thereby saving the processing overhead of the terminal device.

In addition, the embodiment of the present disclosure provides a method for determining whether to change the data transmission scheme of the PDU session. That is, when the PDU session meets a certain condition, the core network device determines to change the data transmission scheme of the PDU session. The condition includes a number of influencing factors for the data transmission scheme of the PDU session, thereby providing a reference for the core network device to determine whether the data transmission scheme of the PDU session needs to be changed, such that the accuracy of the determination result at the core network device can be improved.

Figure 6:
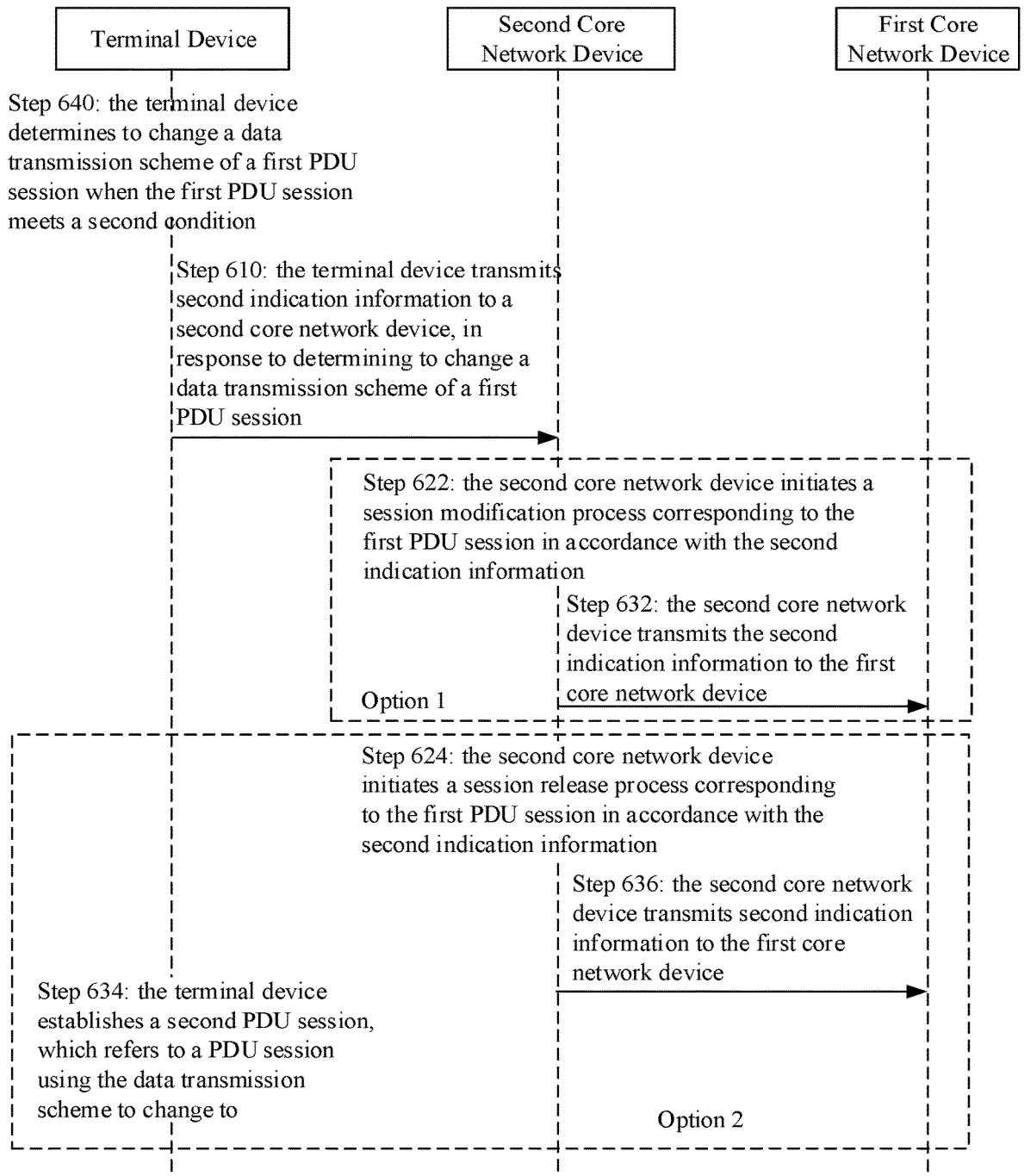
FIG. 6 is a flowchart illustrating a method for changing data transmission scheme according to yet another embodiment of the present disclosure.

FIG. 6 shows a flowchart of another method for changing data transmission scheme according to an embodiment of the present disclosure. The method can be applied to the system architecture shown in FIGS. 1 to 3. The method may include the following step.

At step 610, a terminal device transmits second indication information to a second core network device, in response to determining to change a data transmission scheme of a first PDU session.

Optionally, the data transmission scheme may include at least one of: a control plane data transmission scheme only; a user plane data transmission scheme only; or both the control plane data transmission scheme and the user plane data transmission scheme. In an embodiment of the present disclosure, the first PDU session refers to a PDU session that has been established between a DN and the terminal device, and the second indication information indicates to change the data transmission scheme of the first PDU session. Optionally, the data transmission scheme to change to may be notified in the second indication information; or the data transmission scheme to change to may be predefined in a protocol.

In a possible implementation, after the second core network device receives the second indication information, there can be two options to change the data transmission scheme of the first PDU session. Which of the two options is to be used may depend on a local implementation of the second core network device. These two options will be described below.

Option 1: The second core network device initiates a PDU session modification process.

In an example, as illustrated in FIG. 6, the above method may further include: step 622 in which the second core network device initiates a session modification process corresponding to the first PDU session in accordance with the second indication information.

Optionally, in order to allow the terminal device to update the data transmission scheme of the first PDU session to the data transmission scheme to change to, as illustrated in FIG. 6, the above method may further include: step 632 in which the second core network device transmits the second indication information to the first core network device.

Option 2: The second core network device initiates a PDU session release process.

In an example, as illustrated in FIG. 6, the above method may further include: step 624 in which the second core network device initiates a session release process corresponding to the first PDU session in accordance with the second indication information.

Optionally, in order to perform the PDU connection service using the data transmission scheme to change to, as illustrated in FIG. 6, the above method may further include: step 634 in which the terminal device establishes a second PDU session, which refers to a PDU session using the data transmission scheme to change to. Optionally, the terminal device may establish the second PDU session when it supports and/or prefers to use the data transmission scheme to change to.

Optionally, the above method may further include: step 636 in which the second core network device transmits second indication information to the first core network device.

In another possible implementation, as illustrated in FIG. 6, the above method may further include: step 640 in which the terminal device determines to change the data transmission scheme of the first PDU session when the first PDU session meets a second condition. Optionally, the second condition may include at least one of: a data transmission scheme negotiated between the terminal device and the first core network device changes; a local policy of the terminal device changes; subscription information of the terminal device changes; capability information of the terminal device changes; or capability information of a network device changes (the network device includes the first core network device and/or the second core network device).

The difference between the embodiment in FIG. 4 and the embodiment in FIG. 6 is that entities that determine to change the data transmission scheme of the first PDU session are different. In the embodiment in FIG. 4, the first core network device determines to change the data transmission scheme of the first PDU session, whereas in the embodiment in FIG. 6, the terminal device determines to change the data transmission scheme of the first PDU session. Correspondingly, the first condition in the embodiment in FIG. 4 includes a change in the local policy of the first core network device, while the first condition in the embodiment in FIG. 6 includes a change in the local policy of the terminal device. In addition, for the details in the embodiment of FIG. 6, such as the PDU session, the data transmission scheme of the PDU session, the first PDU session, the data transmission scheme to change to, the session modification process corresponding to the first PDU session, the session release process corresponding to the first PDU session, the establishment of the second PDU session, the determination to change the data transmission scheme of the first PDU session, the second condition, etc., reference can be made to the description of the corresponding content in the embodiment of FIG. 4. For detailed description, reference can be made to the above embodiment described in connection with FIG. 4, and the description thereof will be omitted here.

In summary, in the technical solution according to the embodiment of the present disclosure, when it is determined to be change a data transmission scheme of a PDU session, the data transmission scheme of the PDU session is changed, thereby avoiding the problem that the PDU session can only use a fixed data transmission scheme, and improving the flexibility of the data transmission scheme of the PDU session and thus the capability of the PDU session to adapt to different service scenarios. In addition, the technical solutions according to the embodiments of the present disclosure can avoid the problem that when a data transmission scheme of a certain PDU session is not suitable for a current service scenario, a PDU session having a data transmission scheme suitable for the current service scenario has to be re-established, and avoid unnecessary PDU sessions established between the terminal device and the DN, which would otherwise cause a waste of resources, thereby reducing the processing overhead of the terminal device, and also improving the repetitive utilization of the PDU session.

In addition, in the embodiment of the present disclosure, the core network device can change the data transmission scheme of the PDU session in two options, one is to initiate the session modification process corresponding to the PDU session, and the other is to initiate the session release process corresponding to the PDU session. Then, the terminal device can re-establish the PDU session. Which of the two options is to be used may depend on the local implementation of the core network device. Therefore, the technical solution according to the embodiment of the present disclosure fully considers the different local implementations of the core network devices and the actual applications, thereby providing an improved changing method.

In addition, since the terminal device's own capabilities may only support the data transmission scheme in the released PDU session, or the terminal device may only prefer to use the data transmission scheme in the released PDU session, in the embodiment of the present disclosure, the terminal device can re-establish the PDU session when it supports and/or prefers to use the data transmission scheme to change to, and perform the PDU connection service using the data transmission scheme to change to. This can ensure that the data transmission scheme matches the capabilities and/or preferences of the terminal device, and avoid the problem that the terminal device cannot perform the PDU connection service using the data transmission scheme to change to due to mismatching, and also avoid establishing the second PDU session in case of mismatching, thereby saving the processing overhead of the terminal device.

In addition, the embodiment of the present disclosure provides a method for determining whether to change the data transmission scheme of the PDU session. That is, when the PDU session meets a certain condition, the core network device determines to change the data transmission scheme of the PDU session. The condition includes a number of influencing factors for the data transmission scheme of the PDU session, thereby providing a reference for the core network device to determine whether the data transmission scheme of the PDU session needs to be changed, such that the accuracy of the determination result at the core network device can be improved.

Figure 7:
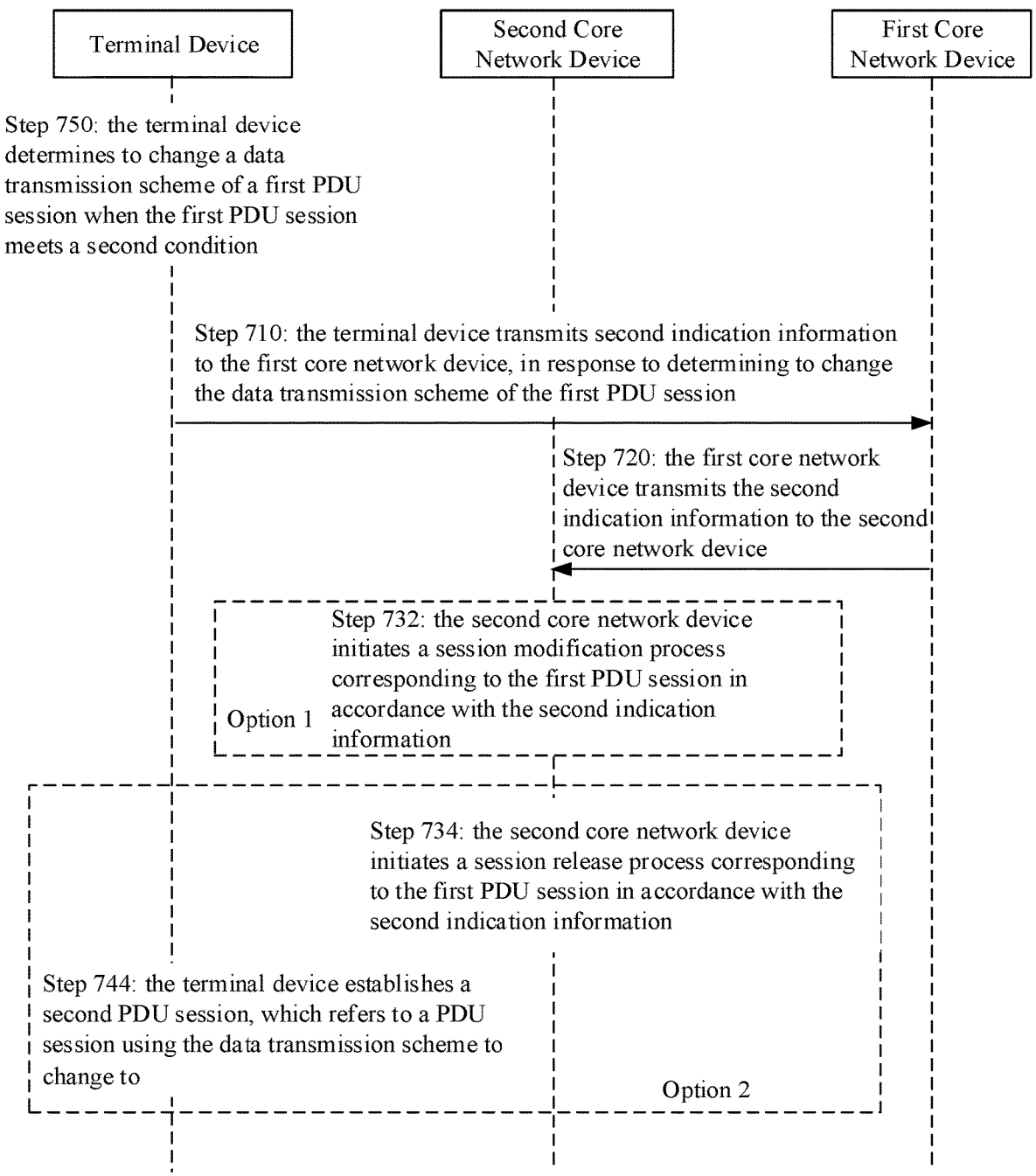
FIG. 7 is a flowchart illustrating a method for changing data transmission scheme according to still another embodiment of the present disclosure.

FIG. 7 shows a flowchart of another method for changing data transmission scheme according to an embodiment of the present disclosure. The method can be applied to the system architecture shown in FIGS. 1 to 3. The method may include the following step.

At step 710, a terminal device transmits second indication information to a first core network device, in response to determining to change a data transmission scheme of a first PDU session.

Optionally, the data transmission scheme may include at least one of: a control plane data transmission scheme only; a user plane data transmission scheme only; or both the control plane data transmission scheme and the user plane data transmission scheme. In an embodiment of the present disclosure, the first PDU session refers to a PDU session that has been established between a DN and the terminal device, and the second indication information indicates to change the data transmission scheme of the first PDU session. Optionally, the data transmission scheme to change to may be notified in the second indication information; or the data transmission scheme to change to may be predefined in a protocol.

In a possible implementation, since the first core network device may not be able to change the data transmission scheme of the first PDU session, in order to perform the PDU connection service using the data transmission scheme to change to, as illustrated in FIG. 7, the above method may further include: step 720 in which the first core network device transmits the second indication information to the second core network device.

In a possible implementation, after the second core network device receives the second indication information, there can be two options to change the data transmission scheme of the first PDU session. Which of the two options is to be used may depend on a local implementation of the second core network device. These two options will be described below.

Option 1: The second core network device initiates a PDU session modification process.

In an example, as illustrated in FIG. 7, the above method may further include: step 732 in which the second core network device initiates a session modification process corresponding to the first PDU session in accordance with the second indication information.

Option 2: The second core network device initiates a PDU session release process.

In an example, as illustrated in FIG. 7, the above method may further include: step 734 in which the second core network device initiates a session release process corresponding to the first PDU session in accordance with the second indication information.

Optionally, in order to perform the PDU connection service using the data transmission scheme to change to, as illustrated in FIG. 7, the above method may further include: step 744 in which the terminal device establishes a second PDU session, which refers to a PDU session using the data transmission scheme to change to. Optionally, the terminal device may establish the second PDU session when it supports and/or prefers to use the data transmission scheme to change to.

In another possible implementation, as illustrated in FIG. 7, the above method may further include: step 750 in which the terminal device determines to change the data transmission scheme of the first PDU session when the first PDU session meets a second condition. Optionally, the second condition may include at least one of: a data transmission scheme negotiated between the terminal device and the first core network device changes; a local policy of the terminal device changes; subscription information of the terminal device changes; capability information of the terminal device changes; or capability information of a network device changes (the network device includes the first core network device and/or the second core network device).

The difference between the embodiment in FIG. 6 and the embodiment in FIG. 7 consists in whether the second indication information is transmitted directly to the second core network device. In the embodiment in FIG. 6, the terminal device transmits the second indication information directly to the second core network device, whereas in the embodiment in FIG. 7, the terminal device first transmits the second indication information to the first core network device, and then the first core network device transmits the second indication information to the second core network device. For the details in the embodiment of FIG. 7, such as the PDU session, the data transmission scheme of the PDU session, the first PDU session, the data transmission scheme to change to, the session modification process corresponding to the first PDU session, the session release process corresponding to the first PDU session, the establishment of the second PDU session, the determination to change the data transmission scheme of the first PDU session, the second condition, etc., reference can be made to the description of the corresponding content in the embodiment of FIG. 4. For detailed description of the embodiment in FIG. 7, reference can be made to the above embodiment described in connection with FIG. 4, and the description thereof will be omitted here.

In summary, in the technical solution according to the embodiment of the present disclosure, when it is determined to be change a data transmission scheme of a PDU session, the data transmission scheme of the PDU session is changed, thereby avoiding the problem that the PDU session can only use a fixed data transmission scheme, and improving the flexibility of the data transmission scheme of the PDU session and thus the capability of the PDU session to adapt to different service scenarios. In addition, the technical solutions according to the embodiments of the present disclosure can avoid the problem that when a data transmission scheme of a certain PDU session is not suitable for a current service scenario, a PDU session having a data transmission scheme suitable for the current service scenario has to be re-established, and avoid unnecessary PDU sessions established between the terminal device and the DN, which would otherwise cause a waste of resources, thereby reducing the processing overhead of the terminal device, and also improving the repetitive utilization of the PDU session.

In addition, in the embodiment of the present disclosure, the core network device can change the data transmission scheme of the PDU session in two options, one is to initiate the session modification process corresponding to the PDU session, and the other is to initiate the session release process corresponding to the PDU session. Then, the terminal device can re-establish the PDU session. Which of the two options is to be used may depend on the local implementation of the core network device. Therefore, the technical solution according to the embodiment of the present disclosure fully considers the different local implementations of the core network devices and the actual applications, thereby providing an improved changing method.

In addition, since the terminal device's own capabilities may only support the data transmission scheme in the released PDU session, or the terminal device may only prefer to use the data transmission scheme in the released PDU session, in the embodiment of the present disclosure, the terminal device can re-establish the PDU session when it supports and/or prefers to use the data transmission scheme to change to, and perform the PDU connection service using the data transmission scheme to change to. This can ensure that the data transmission scheme matches the capabilities and/or preferences of the terminal device, and avoid the problem that the terminal device cannot perform the PDU connection service using the data transmission scheme to change to due to mismatching, and also avoid establishing the second PDU session in case of mismatching, thereby saving the processing overhead of the terminal device.

In addition, the embodiment of the present disclosure provides a method for determining whether to change the data transmission scheme of the PDU session. That is, when the PDU session meets a certain condition, the core network device determines to change the data transmission scheme of the PDU session. The condition includes a number of influencing factors for the data transmission scheme of the PDU session, thereby providing a reference for the core network device to determine whether the data transmission scheme of the PDU session needs to be changed, such that the accuracy of the determination result at the core network device can be improved.

It is to be noted that after understanding the technical solutions of the present disclosure, those skilled in the art may easily envisage other implementations. For example, in response to determining to change the data transmission scheme of the first PDU session, the first core network device may transmit the first indication information to both the second core network device and the terminal device. As to whether the second core network device changes the data transmission scheme or the terminal device changes the data transmission scheme, it can be determined by the second core network device and the terminal device based on their respective capabilities. In another example, when the first core network device determines to change the data transmission scheme of the first PDU session, it can transmit the first indication information to the second core network device, the second core network device can transmit the first indication information to the terminal device, and the terminal device can change the data transmission scheme of the first PDU session. In another example, when the terminal device determines to change the data transmission scheme of the first PDU session, it can transmit the second indication information to both the first core network device and the second core network device. These solutions fall within the scope of the present disclosure.

It is to be noted that, in the above method embodiments, the technical solutions of the present disclosure have been introduced and explained mainly from the perspective of interaction between the first core network device, the second core network device, and the terminal device. The above steps performed by the first core network device can be separately implemented as a method for changing data transmission scheme applied in the first core network device. The above steps performed by the second core network device can be implemented separately as a method for changing data transmission scheme applied in the second core network device. The above steps performed by the terminal device can be separately implemented as a method for changing data transmission scheme applied in the terminal device.

The apparatus embodiments of the present disclosure, as described below, can be used to implement the method embodiments of the present disclosure. For details that are not disclosed in the apparatus embodiments of the present disclosure, reference can be made to the method embodiments of the present disclosure.

Figure 8:
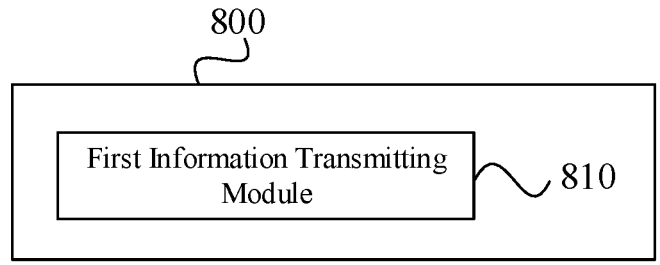
FIG. 8 is a block diagram of an apparatus for changing data transmission scheme according to an embodiment of the present disclosure.

FIG. 8 shows a block diagram of an apparatus for changing data transmission scheme according to an embodiment of the present disclosure. The apparatus has the function for implementing the above example of the method at the first core network device, and the function can be implemented by hardware, or by hardware executing corresponding software. The apparatus may be the first core network device as described above, or may be provided in the first core network device. As illustrated in FIG. 8, the apparatus 800 may include a first information transmitting module 810.

The first information transmitting module 810 is configured to transmit, in response to determining to change a data transmission scheme of a first PDU session, first indication information to a second core network device and/or a terminal device.

Here, the first indication information indicates to change the data transmission scheme of the first PDU session, and the first PDU session refers to a PDU session that has been established between a DN and the terminal device.

Optionally, the data transmission scheme to change to may be notified in the first indication information; or the data transmission scheme to change to may be predefined in a protocol.

Figure 9:
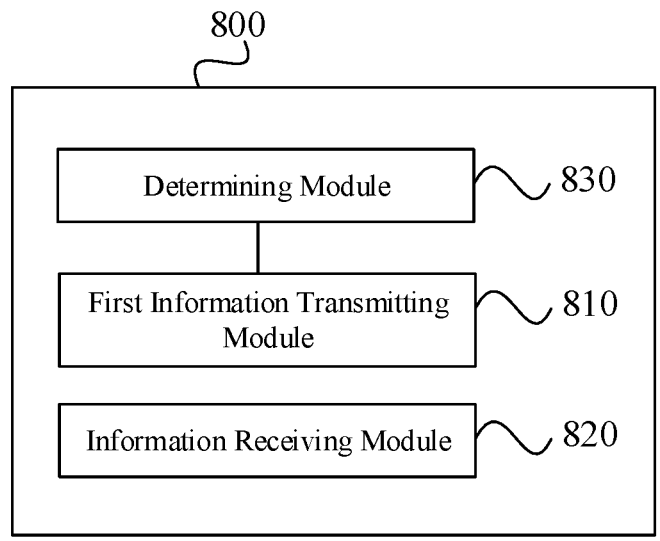
FIG. 9 is a block diagram of an apparatus for changing data transmission scheme according to another embodiment of the present disclosure.

Optionally, as illustrated in FIG. 9, the apparatus 800 may further include: an information receiving module 820 configured to receive second indication information transmitted by the second core network device and/or the terminal device. The second indication information is transmitted when the terminal device determines to change the data transmission scheme of the first PDU session, and the second indication information indicates to change the data transmission scheme of the first PDU session.

Optionally, the data transmission scheme to change to may be notified in the second indication information; or the data transmission scheme to change to may be predefined in a protocol.

Optionally, the data transmission scheme may include at least one of: a control plane data transmission scheme only; a user plane data transmission scheme only; or both the control plane data transmission scheme and the user plane data transmission scheme.

Optionally, as illustrated in FIG. 9, the apparatus 800 may further include: a determining module 830 configured to determine to change the data transmission scheme of the first PDU session when the first PDU session meets a first condition. The first condition may include at least one of: a data transmission scheme negotiated between the terminal device and the first core network device changes; a local policy of the first core network device changes; subscription information of the terminal device changes; capability information of the terminal device changes; or capability information of a network device changes. The network device includes the first core network device and/or the second core network device.

Figure 10:
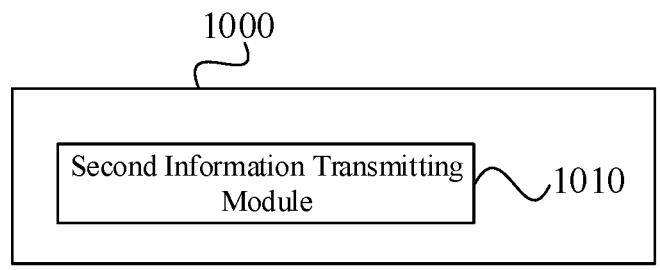
FIG. 10 is a block diagram of an apparatus for changing data transmission scheme according to yet another embodiment of the present disclosure.

FIG. 10 shows a block diagram of an apparatus for changing data transmission scheme according to an embodiment of the present disclosure. The apparatus has the function of implementing the above example of the method at the terminal device, and the function can be implemented by hardware, or by hardware executing corresponding software. The apparatus may be the terminal device described above, or may be provided in the terminal device. As illustrated in FIG. 10, the apparatus 1000 may include a second information transmitting module 1010.

The second information transmitting module 1010 is configured to transmit, in response to determining to change a data transmission scheme of a first PDU session, second indication information to a first core network device and/or a second core network device.

Here, the second indication information indicates to change the data transmission scheme of the first PDU session, and the first PDU session refers to a PDU session that has been established between a DN and the terminal device.

Optionally, the data transmission scheme to change to may be notified in the second indication information; or the data transmission scheme to change to may be predefined in a protocol.

Figure 11:
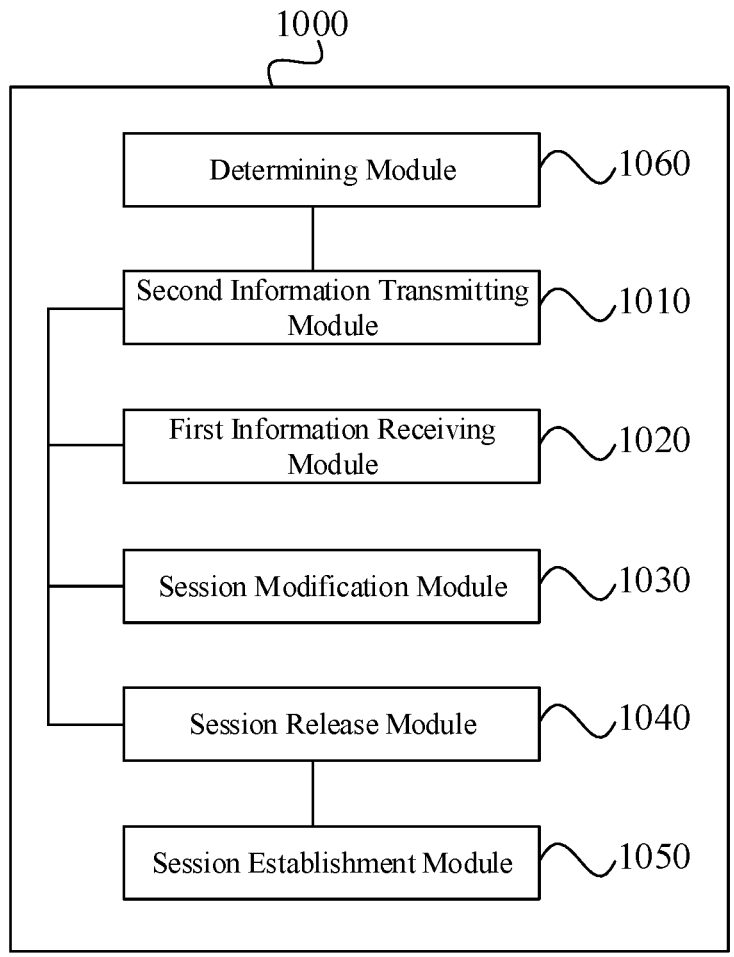
FIG. 11 is a block diagram of an apparatus for changing data transmission scheme according to still another embodiment of the present disclosure.

Optionally, as illustrated in FIG. 11, the apparatus 1000 may further include: a first information receiving module 1020 configured to receive first indication information transmitted by the first core network device and/or the second core network device. The first indication information is transmitted when the first core network device determines to change the data transmission scheme of the first PDU session, and the first indication information indicates to change the data transmission scheme of the first PDU session.

Optionally, the data transmission scheme to change to may be notified in the first indication information; or the data transmission scheme to change to may be predefined in a protocol.

Optionally, as illustrated in FIG. 11, the apparatus may further include: a session modification module 1030 configured to initiate a session modification process corresponding to the first PDU session in accordance with the first indication information, the session modification process corresponding to the first PDU session being to change the data transmission scheme of the first PDU session to the data transmission scheme to change to as indicated in the first indication information; or a session release module 1040 configured to initiate a session release process corresponding to the first PDU session in accordance with the first indication information.

Optionally, as illustrated in FIG. 11, the apparatus may further include: a session establishment module 1050 configured to establish a second PDU session. The second PDU session refers to a PDU session using the data transmission scheme to change to.

Optionally, as illustrated in FIG. 11, the session establishment module 1050 may be configured to establish the second PDU session when the terminal device supports and/or prefers to use the data transmission scheme to change to.

Optionally, the data transmission scheme may include at least one of: a control plane data transmission scheme only; a user plane data transmission scheme only; or both the control plane data transmission scheme and the user plane data transmission scheme.

Optionally, as illustrated in FIG. 11, the apparatus 1000 may further include: a determining module 1060 configured to determine to change the data transmission scheme of the first PDU session when the first PDU session meets a second condition. Here, the second condition may include at least one of: a data transmission scheme negotiated between the terminal device and the first core network device changes; a local policy of the terminal device changes; subscription information of the terminal device changes; capability information of the terminal device changes; or capability information of a network device changes. The network device includes the first core network device and/or the second core network device.

Figure 12:
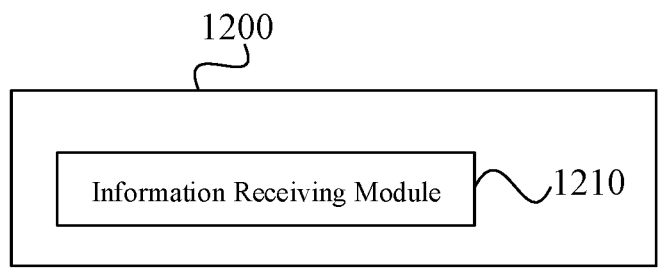
FIG. 12 is a block diagram of an apparatus for changing data transmission scheme according to still yet another embodiment of the present disclosure.

FIG. 12 shows a block diagram of an apparatus for changing data transmission scheme according to an embodiment of the present disclosure. The apparatus has the function of implementing the above example of the method at the second core network device, and the function can be implemented by hardware, or by hardware executing corresponding software. The apparatus may be the second core network device described above, or may be provided in the second core network device. As illustrated in FIG. 12, the apparatus 1200 may include an information receiving module 1210.

The information receiving module 1210 is configured to receive first indication information transmitted by a first core network device or second indication information transmitted by a terminal device. The first indication information is transmitted when the first core network device determines to change a data transmission scheme of a first PDU session, and the second indication information is transmitted when the terminal device determines to change the data transmission scheme of the first PDU session. The first indication information and the second indication information each indicate to change the data transmission scheme of the first PDU session. The first PDU session refers to a PDU session that has been established between a DN and the terminal device.

Optionally, when the first core network device determines to change the data transmission scheme of the first PDU session, the data transmission scheme to change to may be notified in the first indication information; or the data transmission scheme to change to may be predefined in a protocol.

Optionally, when the terminal device determines to change the data transmission scheme of the first PDU session, the data transmission scheme to change to may be notified in the second indication information; or the data transmission scheme to change to may be predefined in a protocol.

Figure 13:
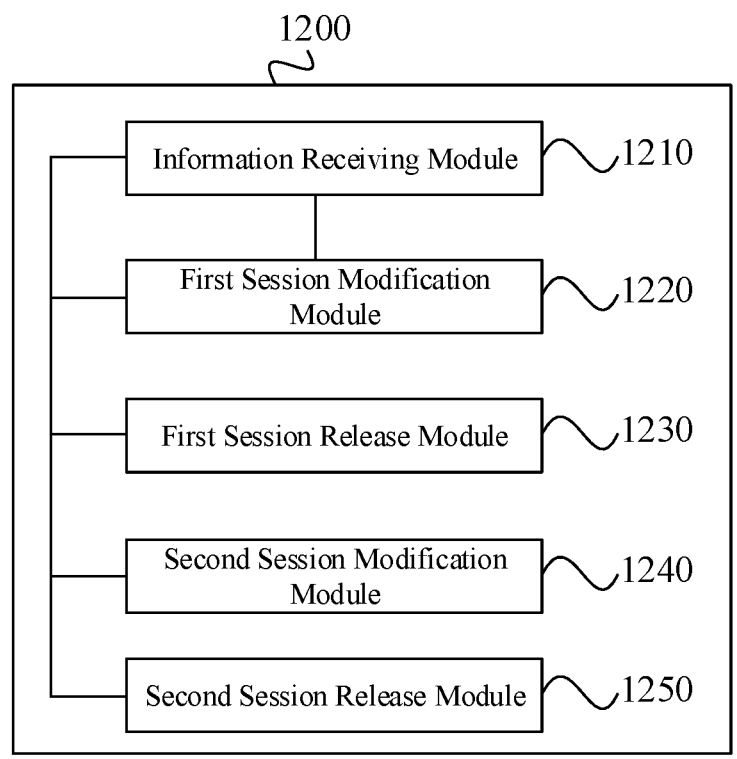
FIG. 13 is a block diagram of an apparatus for changing data transmission scheme according to a further embodiment of the present disclosure.

Optionally, as illustrated in FIG. 13, the apparatus 1200 may further include: a first session modification module 1220 configured to initiate a session modification process corresponding to the first PDU session in accordance with the first indication information, the session modification process corresponding to the first PDU session being to change the data transmission scheme of the first PDU session to the data transmission scheme to change to as indicated in the first indication information; or a first session release module 1230 configured to initiate a session release process corresponding to the first PDU session in accordance with the first indication information.

Optionally, as illustrated in FIG. 13, the apparatus 1200 may further include: a second session modification module 1240 configured to initiate a session modification process corresponding to the first PDU session in accordance with the second indication information, the session modification process corresponding to the first PDU session being to change the data transmission scheme of the first PDU session to the data transmission scheme to change to as indicated in the second indication information; or a second session release module 1250 configured to initiate a session release process corresponding to the first PDU session in accordance with the second indication information.

Optionally, the data transmission scheme may include at least one of: a control plane data transmission scheme only; a user plane data transmission scheme only; or both the control plane data transmission scheme and the user plane data transmission scheme.

It is to be noted that, when the apparatuses according to in the above embodiments implement their respective functions, the division of the above functional modules is used as an example for illustration only. In actual applications, the above functions can be allocated to different functional modules according to actual needs. That is, the content structure of each apparatus may be divided into different functional modules to complete all or part of the functions described above.

Regarding the apparatuses in the above embodiments, the operation performed by each module has been described in detail in the corresponding method embodiments, and detailed description thereof will be omitted here.

Figure 14:
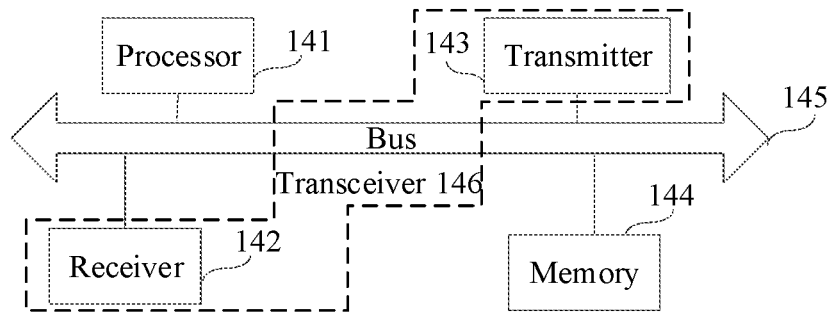
FIG. 14 is a block diagram showing a structure of a core network device according to an embodiment of the present disclosure.

FIG. 14 shows a schematic diagram of a structure of a core network device 140 according to an embodiment of the present disclosure. For example, the core network device may be the first core network device described above and may be configured to perform the method for changing data transmission scheme applied in the first core network device. In another example, the core network device may be the second core network device described above, and may be configured to perform the method for changing data transmission scheme applied in the second core network device described above. In particular, the core network device 140 may include: a processor 141, a receiver 142, a transmitter 143, a memory 144, and a bus 145.

The processor 141 includes one or more processing cores, and the processor 141 implements various functional applications and information processing by executing software programs and modules.

The receiver 142 and the transmitter 143 may be implemented as a transceiver 146, which may be a communication chip.

The memory 144 is connected to the processor 141 via the bus 145.

The memory 144 may be configured to store a computer program, and the processor 141 may be configured to execute the computer program to implement the steps performed by the first core network device in the above method embodiment, or to implement the steps performed by the second core network device in the above method embodiment.

In addition, the memory 144 may be implemented by any type of volatile or non-volatile storage device or any combination thereof. The volatile or non-volatile storage device may include, but not limited to, Random-Access Memory (RAM), Read-Only Memory (ROM), Erasable Programmable Read-Only Memory (EPROM), Electrically Erasable Programmable Read-Only Memory (EEPROM), flash memory, or any other solid-state storage technology, Compact Disc Read-Only Memory (CD-ROM), Digital Video Disc (DVD), or any other optical storage, tape cartridge, magnetic tape, magnetic disk storage, or any other magnetic storage device. Here, when the core network device is the first core network device described above: the transceiver 146 is configured to transmit, in response to determining to change a data transmission scheme of a first PDU session, first indication information to a second core network device and/or a terminal device. Here, the first indication information indicates to change the data transmission scheme of the first PDU session, and the first PDU session refers to a PDU session that has been established between a DN and the terminal device.

Optionally, the data transmission scheme to change to may be notified in the first indication information; or the data transmission scheme to change to may be predefined in a protocol.

Optionally, the transceiver 146 may be further configured to receive second indication information transmitted by the second core network device and/or the terminal device. The second indication information is transmitted when the terminal device determines to change the data transmission scheme of the first PDU session, and the second indication information indicates to change the data transmission scheme of the first PDU session.

Optionally, the data transmission scheme to change to may be notified in the second indication information; or the data transmission scheme to change to may be predefined in a protocol.

Optionally, the data transmission scheme may include at least one of: a control plane data transmission scheme only; a user plane data transmission scheme only; or both the control plane data transmission scheme and the user plane data transmission scheme.

Optionally, the processor 141 may be configured to determine to change the data transmission scheme of the first PDU session when the first PDU session meets a first condition. The first condition may include at least one of: a data transmission scheme negotiated between the terminal device and the first core network device changes; a local policy of the first core network device changes; subscription information of the terminal device changes; capability information of the terminal device changes; or capability information of a network device changes. The network device includes the first core network device and/or the second core network device.

When the core network device is the second core network device described above, the transceiver 146 is configured to receive first indication information transmitted by a first core network device or second indication information transmitted by a terminal device. The first indication information is transmitted when the first core network device determines to change a data transmission scheme of a first PDU session, and the second indication information is transmitted when the terminal device determines to change the data transmission scheme of the first PDU session. The first indication information and the second indication information each indicate to change the data transmission scheme of the first PDU session, and the first PDU session refers to a PDU session that has been established between a DN and the terminal device.

Optionally, when the first core network device determines to change the data transmission scheme of the first PDU session, the data transmission scheme to change to may be notified in the first indication information; or the data transmission scheme to change to may be predefined in a protocol.

Optionally, when the terminal device determines to change the data transmission scheme of the first PDU session, the data transmission scheme to change to may be notified in the second indication information; or the data transmission scheme to change to may be predefined in a protocol.

Optionally, the processor 141 may be configured to: initiate a session modification process corresponding to the first PDU session in accordance with the first indication information, the session modification process corresponding to the first PDU session being to change the data transmission scheme of the first PDU session to the data transmission scheme to change to as indicated in the first indication information; or initiate a session release process corresponding to the first PDU session in accordance with the first indication information.

Optionally, the processor 141 may be further configured to: initiate a session modification process corresponding to the first PDU session in accordance with the second indication information, the session modification process corresponding to the first PDU session being to change the data transmission scheme of the first PDU session to the data transmission scheme to change to as indicated in the second indication information; or initiate a session release process corresponding to the first PDU session in accordance with the second indication information.

Optionally, the data transmission scheme may include at least one of: a control plane data transmission scheme only; a user plane data transmission scheme only; or both the control plane data transmission scheme and the user plane data transmission scheme.

Figure 15:
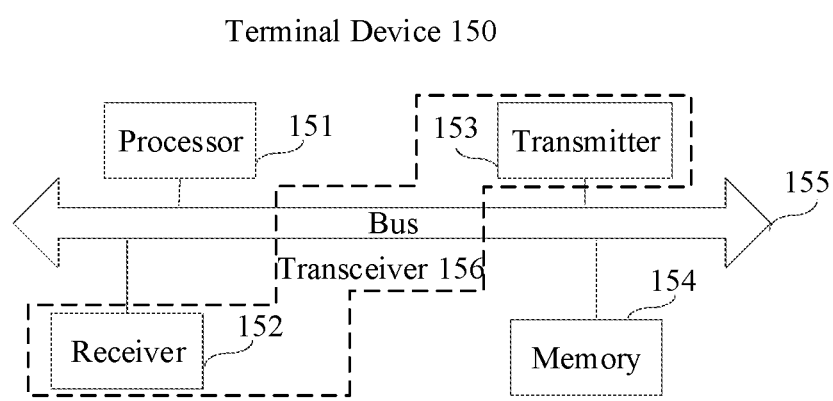
FIG. 15 is a block diagram showing a structure of a terminal device according to an embodiment of the present disclosure.

FIG. 15 shows a schematic diagram of a structure of a terminal device 150 according to an embodiment of the present disclosure. For example, the terminal device may be the terminal device described above and may be configured to perform the above method for changing data transmission scheme applied in the terminal device. In particular, the terminal device 150 may include: a processor 151, a receiver 152, a transmitter 153, a memory 154, and a bus 155.

The processor 151 includes one or more processing cores, and the processor 151 implements various functional applications and information processing by executing software programs and modules.

The receiver 152 and the transmitter 153 may be implemented as a transceiver 156, which may be a communication chip.

The memory 154 is connected to the processor 151 via the bus 155.

The memory 154 may be configured to store a computer program, and the processor 151 may be configured to execute the computer program to implement the steps performed by the terminal device in the above method embodiments.

In addition, the memory 154 may be implemented by any type of volatile or non-volatile storage device or any combination thereof. The volatile or non-volatile storage device may include, but not limited to, Random-Access Memory (RAM), Read-Only Memory (ROM), Erasable Programmable Read-Only Memory (EPROM), Electrically Erasable Programmable Read-Only Memory (EEPROM), flash memory, or any other solid-state storage technology, Compact Disc Read-Only Memory (CD-ROM), Digital Video Disc (DVD), or any other optical storage, tape cartridge, magnetic tape, magnetic disk storage, or any other magnetic storage devices.

The transceiver 156 is configured to transmit, in response to determining to change a data transmission scheme of a first PDU session, second indication information to a first core network device and/or a second core network device. The second indication information indicates to change the data transmission scheme of the first PDU session, and the first PDU session refers to a PDU session that has been established between a DN and the terminal device.

Optionally, the data transmission scheme to change to may be notified in the second indication information; or the data transmission scheme to change to may be predefined in a protocol.

Optionally, the transceiver 156 may be further configured to receive first indication information transmitted by the first core network device and/or the second core network device. The first indication information is transmitted when the first core network device determines to change the data transmission scheme of the first PDU session, and the first indication information indicates to change the data transmission scheme of the first PDU session.

Optionally, the data transmission scheme to change to may be notified in the first indication information; or the data transmission scheme to change to may be predefined in a protocol.

Optionally, the processor 151 may be configured to initiate a session modification process corresponding to the first PDU session in accordance with the first indication information, the session modification process corresponding to the first PDU session being to change the data transmission scheme of the first PDU session to the data transmission scheme to change to as indicated in the first indication information; or initiate a session release process corresponding to the first PDU session in accordance with the first indication information.

Optionally, the processor 151 may be further configured to establish a second PDU session, the second PDU session referring to a PDU session using the data transmission scheme to change to.

Optionally, the processor 151 may be further configured to establish the second PDU session when the terminal device supports and/or prefers to use the data transmission scheme to change to.

Optionally, the data transmission scheme may include at least one of: a control plane data transmission scheme only; a user plane data transmission scheme only; or both the control plane data transmission scheme and the user plane data transmission scheme.

Optionally, the processor 151 may be further configured to determine to change the data transmission scheme of the first PDU session when the first PDU session meets a second condition. Here, the second condition may include at least one of: a data transmission scheme negotiated between the terminal device and the first core network device changes; a local policy of the terminal device changes; subscription information of the terminal device changes; capability information of the terminal device changes; or capability information of a network device changes. The network device includes the first core network device and/or the second core network device.

An embodiment of the present disclosure also provides a computer-readable storage medium. The computer-readable storage medium has a computer program stored therein. The computer program, when executed by a processor of a first core network device, implements the method for changing data transmission scheme applied in the first core network device.

An embodiment of the present disclosure also provides a computer-readable storage medium. The computer-readable storage medium has a computer program stored therein. The computer program, when executed by a processor of a terminal device, implements the method for changing data transmission scheme applied in the terminal device.

An embodiment of the present disclosure also provides a computer-readable storage medium. The computer-readable storage medium has a computer program stored therein. The computer program, when executed by a processor of a second core network device, implements the method for changing data transmission scheme applied in the second core network device.

The embodiment of the present disclosure also provides a chip. The chip includes a programmable logic circuit and/or program instructions. The chip is configured to, when running on a first core network device, implement the above method for changing data transmission scheme applied in the first core network device.

The embodiment of the present disclosure also provides a chip. The chip includes a programmable logic circuit and/or program instructions. The chip is configured to, when running on a terminal device, implement the above method for changing data transmission scheme applied in the terminal device.

The embodiment of the present disclosure also provides a chip. The chip includes a programmable logic circuit and/or program instructions. The chip is configured to, when running on a second core network device, implement the above method for changing data transmission scheme applied in the second core network device.

The present disclosure also provides a computer program product which, when running on a computer at a first core network device, causes the computer to perform the above method for changing data transmission scheme applied in the first core network device.

The present disclosure also provides a computer program product which, when running on a computer at a terminal device, causes the computer to perform the above method for changing data transmission scheme applied in the terminal device.

The present disclosure also provides a computer program product which, when running on a computer at a second core network device, causes the computer to perform the above method for changing data transmission scheme applied in the second core network device.

It can be appreciated by those skilled in the art that, in one or more of the above examples, the functions described in the embodiments of the present disclosure may be implemented by hardware, software, firmware, or any combination thereof. When implemented by software, these functions can be stored in a computer-readable medium or transmitted as one or more instructions or codes on a computer-readable medium. The computer-readable medium includes a computer storage medium and a communication medium. Here, the communication medium includes any medium that facilitates transfer of a computer program from one place to another. The storage medium may be any available medium that can be accessed by a general-purpose or special-purpose computer.

The above described are only exemplary embodiments of the present disclosure and are not intended to limit the present disclosure. Any modifications, equivalents, improvements, etc., that are made without departing from the spirit and principle of the present disclosure should be encompassed by the scope of the present disclosure.

What is claimed is:

1. A method for changing data transmission scheme, applied in a first core network device, the method comprising:
   transmitting, in response to determining to change a data transmission scheme of a first Protocol Data Unit (PDU) session in Third Generation Partnership Project (3GPP) Fifth Generation System (5GS) to another data transmission scheme of the first Protocol Data Unit (PDU) session in the 3GPP 5GS, first indication information to a second core network device and/or a terminal device,
   wherein the first indication information indicates to change the data transmission scheme of the first PDU session in the 3GPP 5GS to the other data transmission scheme of the first Protocol Data Unit (PDU) session in the 3GPP 5GS, and the first PDU session refers to a PDU session that has been established between a Data Network (DN) and the terminal device,
   wherein the data transmission scheme to change to is one default data transmission scheme to change to that is predefined in a protocol, and the data transmission scheme to change to is carried in the first indication information.

2. The method according to claim 1, wherein the data transmission scheme in the 3GPP 5GS comprises:
   a control plane data transmission scheme only.

3. The method according to claim 1, further comprising:
   determining to change the data transmission scheme of the first PDU session when the first PDU session meets a first condition,
   wherein the first condition comprises at least one of:
   a data transmission scheme negotiated between the terminal device and the first core network device changes;
   a local policy of the first core network device changes; or
   subscription information of the terminal device changes.

4. A core network device, comprising a processor and a transceiver connected to the processor, wherein:
   the transceiver is configured to transmit, in response to determining to change a data transmission scheme of a first Protocol Data Unit (PDU) session in a 3GPP 5GS to another data transmission scheme of the first Protocol Data Unit (PDU) session in the 3GPP 5GS, first indication information to a second core network device and/or a terminal device,
   wherein the first indication information indicates to change the data transmission scheme of the first PDU session in the 3GPP 5GS to the other data transmission scheme of the first Protocol Data Unit (PDU) session in the 3GPP 5GS, and the first PDU session refers to a PDU session that has been established between a Data Network (DN) and the terminal device,
   wherein the data transmission scheme to change to is one default data transmission scheme to change to that is predefined in a protocol, and the data transmission scheme to change to is carried in the first indication information.

5. The core network device according to claim 4, wherein the data transmission scheme in the 3GPP 5GS comprises:
   a control plane data transmission scheme only.

6. The core network device according to claim 4, wherein the processor is configured to determine to change the data transmission scheme of the first PDU session in the 3GPP 5GS to the other data transmission scheme of the first Protocol Data Unit (PDU) session in the 3GPP 5GS when the first PDU session meets a first condition, wherein the first condition comprises at least one of:
   a data transmission scheme negotiated between the terminal device and the first core network device changes;
   a local policy of the first core network device changes; or
   subscription information of the terminal device changes.

7. A core network device, comprising a processor and a transceiver connected to the processor, wherein:
   the transceiver is configured to receive first indication information transmitted by a first core network device,
   wherein the first indication information is transmitted when the first core network device determines to change a data transmission scheme of a first Protocol Data Unit (PDU) session in a 3GPP 5GS to another data transmission scheme of the first Protocol Data Unit (PDU) session in the 3GPP 5GS, the first indication information indicating to change the data transmission scheme of the first PDU session in the 3GPP 5GS to the other data transmission scheme of the first Protocol Data Unit (PDU) session in the 3GPP 5GS, and the first PDU session referring to a PDU session that has been established between a Data Network (DN) and the terminal device,
   wherein the data transmission scheme to change to is one default data transmission scheme to change to that is predefined in a protocol, and the data transmission scheme to change to is carried in the first indication information.

8. The core network device according to claim 7, wherein the processor is configured to, subsequent to receiving the first indication information transmitted by the first core network device:
   initiate a session release process corresponding to the first PDU session in accordance with the first indication information.

9. The core network device according to claim 7, wherein the first indication information is transmitted when the first core network device determines, in response to the data transmission scheme of the first Protocol Data Unit (PDU) session in the 3GPP 5GS meeting a first condition, to change the data transmission of the First PDU session in the 3GPP 5GS to the other data transmission scheme of the first Protocol Data Unit (PDU) session in the 3GPP 5GS,
   wherein the first condition comprises at least one of:
   a data transmission scheme negotiated between the terminal device and the first core network device changes;
   a local policy of the first core network device changes; or subscription information of the terminal device changes.

\* \* \* \* \*